United States Patent
Thomas et al.

(10) Patent No.: US 10,450,997 B2
(45) Date of Patent: Oct. 22, 2019

(54) METHODS AND SYSTEMS FOR ADJUSTING A DIRECT FUEL INJECTOR AND A PORT FUEL INJECTOR

(71) Applicant: Ford Global Technologies, LLC, Dearborn, MI (US)

(72) Inventors: Joseph Lyle Thomas, Kimball, MI (US); Ethan D. Sanborn, Saline, MI (US); Daniel Dusa, West Bloomfield, MI (US); Paul Hollar, Belleville, MI (US); Mark Meinhart, Dexter, MI (US); Ian D. Campbell, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/596,919

(22) Filed: May 16, 2017

(65) Prior Publication Data

US 2018/0334984 A1   Nov. 22, 2018

(51) Int. Cl.
*F02D 41/40* (2006.01)
*F02D 41/30* (2006.01)
*F02D 41/38* (2006.01)

(52) U.S. Cl.
CPC ....... *F02D 41/402* (2013.01); *F02D 41/3094* (2013.01); *F02D 2041/389* (2013.01); *F02D 2200/101* (2013.01)

(58) Field of Classification Search
CPC .. F02D 41/402; F02D 41/26; F02D 2200/101; F02D 2041/389
See application file for complete search history.

(56) References Cited

U.S. PATENT DOCUMENTS

| 5,499,608 | A | * | 3/1996 | Meister | ................... | F02D 41/32 123/467 |
|---|---|---|---|---|---|---|
| 8,100,107 | B2 | | 1/2012 | Bidner et al. | | |
| 8,165,788 | B2 | | 4/2012 | Surnilla et al. | | |
| 8,447,496 | B2 | | 5/2013 | Krengel et al. | | |
| 8,567,370 | B2 | * | 10/2013 | Bidner | ................ | F02D 41/0025 123/299 |
| 9,255,541 | B2 | | 2/2016 | Surnilla et al. | | |
| 9,303,577 | B2 | | 4/2016 | Surnilla et al. | | |
| 9,404,435 | B2 | | 8/2016 | Ranga et al. | | |

(Continued)

OTHER PUBLICATIONS

Sanborn, E. et al., "Methods and Systems for Adjusting a Direct Fuel Injector," U.S. Appl. No. 15/596,981, filed May 16, 2017, 70 pages.

(Continued)

*Primary Examiner* — Carl C Staubach
(74) *Attorney, Agent, or Firm* — Julia Voutyras; McCoy Russell LLP

(57) ABSTRACT

Methods and systems are provided for reducing direct injector fueling errors due to injection variability in a transition region of a direct injector map. Fuel injection, including usage of one or more direct and port injected fuel pulses, may be planned based on engine operating conditions including engine temperature and driver demand. Responsive to any of the direct injected fuel pulses having a pulse-width that lies in a high variability transition region of the direct injector, the fuel injection may be adjusted via adjustments to a number and/or split ratio of the injections so as to not operate in the transition region.

20 Claims, 9 Drawing Sheets

(56) References Cited

U.S. PATENT DOCUMENTS

| | | | |
|---|---|---|---|
| 9,556,784 B2 | 1/2017 | Leone | |
| 9,611,823 B2 * | 4/2017 | Schwarte | F02D 41/2096 |
| 2007/0000478 A1 * | 1/2007 | Sadakane | F02D 41/38 |
| | | | 123/431 |
| 2010/0305831 A1 * | 12/2010 | Bagnasco | F02D 41/2438 |
| | | | 701/103 |
| 2012/0116702 A1 * | 5/2012 | Beer | F02D 41/20 |
| | | | 702/65 |
| 2012/0318883 A1 * | 12/2012 | Kusakabe | F02D 41/20 |
| | | | 239/1 |
| 2013/0197837 A1 * | 8/2013 | Rosel | F02D 41/20 |
| | | | 702/64 |
| 2013/0221138 A1 * | 8/2013 | Rogler | F02M 51/06 |
| | | | 239/585.5 |
| 2015/0260135 A1 * | 9/2015 | Izzo | F02M 51/061 |
| | | | 123/482 |
| 2016/0153391 A1 * | 6/2016 | Ranga | F02D 41/402 |
| | | | 701/104 |
| 2016/0169145 A1 | 6/2016 | Surnilla et al. | |
| 2016/0356228 A1 | 12/2016 | Liu et al. | |

OTHER PUBLICATIONS

United States Patent and Trademark Office, Office Action Issued in U.S. Appl. No. 15/596,981, dated Jun. 27, 2018, 11 pages.

* cited by examiner

METHODS AND SYSTEMS FOR ADJUSTING A DIRECT FUEL INJECTOR AND A PORT FUEL INJECTOR

FIELD

The present description relates generally to methods and systems for adjusting operation of a direct fuel injector for an internal combustion engine.

BACKGROUND/SUMMARY

Internal combustion engines may utilize direct fuel injection, wherein fuel is directly injected in to an engine cylinder to improve mixture preparation and to reduce cylinder charge temperatures. This may be in place of, or in addition to, port fuel injection, wherein fuel is injected into an intake port, upstream of an intake valve of an engine cylinder. An amount of time a direct fuel injector is activated (the direct injection pulse-width) may be a function of fuel pressure supplied to the injector, engine speed and engine load. To leverage the benefits of a direct injection, it may be advantageous to have full control over the pulse width range of the direct fuel injector. This includes a wide range of operating conditions including but not limited to fuel rail pressure, engine speeds and mass fuel flow.

However, the performance of solenoid-controlled direct fuel injectors may have a limitation in their flow characteristics between the ballistic and full lift regions. This region is normally referred to as the transition region of the direct fuel injector. In this region, the flow rate of the fuel injector is inaccurate and unpredictable, causing shot-to-shot as well as part-to-part variability. For example, the direct fuel injector may deliver more or less fuel than desired in the transition region. Further, the variability in the transition region may not show a linear trend, making it difficult to learn and compensate for the variability. The injector variability may cause cylinder torque output imbalance due to the different amount of fuel injected into each cylinder, and may also cause higher tail pipe emissions and reduced fuel economy due to an inability to correctly meter the fuel to be injected into each cylinder. As a result, there may be engine operating regions where the direct fuel injector cannot adequately meet NVH, drivability, and emissions requirements.

Various approaches have been developed to reduce direct injector variability. One example approach is shown by Ranga et al. in US20160153391. Therein, a direct fuel injection is split into multiple injections, one of which has a pulse-width small enough to be delivered in the ballistic region of the direct injector. A transfer function of the injector is learned based on a lambda value and the split ratio. Subsequent direct injection is adjusted based on the learned transfer function.

However, the inventors herein have recognized potential issues with the approach of '391 and other related approaches. As one example, the variability of the injector in the transition region remains unmapped. The various approaches update the transfer function based on a learned injector variability in the ballistic region, wherein the injector pulse-width is smaller than in the transition region. However, there may still be fueling errors for larger injection pulse-widths that are outside the ballistic region but smaller than injection pulse-widths that are inside the lift region. As a result, NVH, drivability, and emissions issues may persist. As an example, in the ballistic region, increasing the electric pulse width to the fuel injector increases the amount of mass delivered. While there may be some variability in the increasing, the variability may be learned and the shape or shift of a slope in the ballistic region can be adjusted to account for the variability. However, in the transition region, an increased pulse width can actually result in the fuel mass injected decreasing. Consequently, it may not be possible to simply shift and reshape the slope of the transition region. The variability is exacerbated due to the slope in the transition region being different for each injector, as well as being significantly different from shot to shot.

In one example, the issues described above may be addressed by a method for an engine comprising: delivering fuel to a cylinder on a combustion cycle as multiple direct injections; and responsive to a fuel mass of one of the multiple direct injections being in a transition region of a direct injector map, updating one or more of a ratio of fuel delivered in each of the multiple direct injections and a number of the multiple injections to move the fuel mass of the one of the multiple direct injections out of the transition region. In this way, direct injector variability in the transition region can be addressed.

As an example, an engine controller may determine an initial fuel injection profile based on engine operating conditions. This may include, for example, a total fuel mass to be delivered via direct injection, a number of direct injections over which to deliver the total fuel mass (e.g., over 2-4 injections), and a split ratio of the multiple direct injections. The split ratio may include a ratio of the portion of the total fuel mass to be delivered via a first of the multiple direct injections relative to the portion of the total fuel mass to be delivered via a second (and third, and so on) of the multiple direct injections. A fuel injector pulse-width to be commanded is then determined based on the split ratio, including based on the fuel mass to be delivered in each of the multiple injections, as well as based on fuel rail pressure. If the pulse-width for any of the injections is determined to be within the transition region of the direct injector, the controller may update the injection profile to operate outside the transition region. In particular, the controller may modify the fuel mass delivered to each of the injections based on their location within the transition region, and their distance from the bordering ballistic and lift regions, thereby updating the split ratio. For example, the fuel mass of an injection close to the ballistic region may be decreased to move the injection from the transition region into the ballistic region. As another example, the fuel mass of an injection close to the lift region may be increased to move the injection from the transition region into the lift region. As such, the fuel mass of all the injections may be adjusted to maintain the total fuel mass.

In still further examples, additionally or optionally, the number of injections of a split injection may be updated. For example, responsive to the pulse-width of at least one of the multiple direct injections being within the transition region, the number of injections may be reduced. By merging the fuel mass of 2 or more injections, the pulse width may be moved into the full lift region (linear region). As another example, responsive to the pulse-width of a single direct injection being within the transition region, the number of injections may be increased. By splitting the fuel mass into 2 or more injections, the pulse width of an injection may be moved into the full lift region while the pulse width of another injection may be moved into the ballistic region. Further still, in engines configured with direct and port injection, a split ratio of the total fuel mass to be delivered via direct injection relative to port injection may be updated. In still further examples, a combination of the above-mentioned approaches may be selected. The selection may be based on engine operating conditions such as engine speed and NVH constraints.

In this way, direct injector variability is reduced. The technical effect of adjusting a direct injection fuel mass based on a location of the pulse width of the injection on a map of direct injector operating regions is that the direct fuel injector may not be operated at pulse widths where non-linear fuel injector behavior occurs. At the same time, a total fuel mass may be maintained. As a result of operating outside the transition region of the direct injector, engine air-fuel ratio and torque errors may be reduced. Further, the approach may reduce engine emissions and NVH issues. Overall, drivability is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
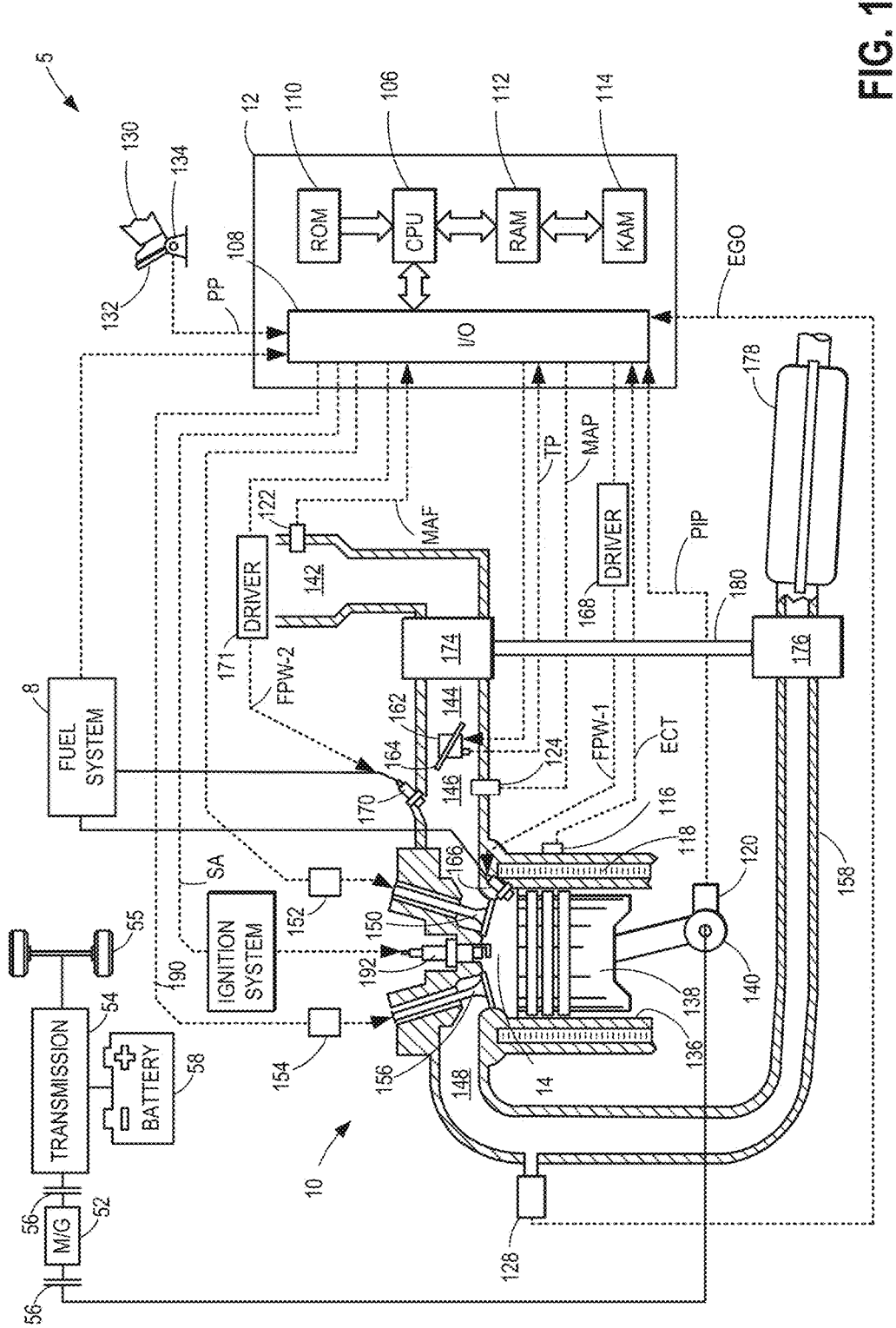
FIG. 1 is a schematic diagram of an engine system.

The following description relates to systems and methods for improving direct injector performance in an engine system, such as the engine system of FIG. 1. The engine may be operated via a controller according to a control routine, such as the example method of FIGS. 2-3, to operate the direct fuel injector outside of a transition region (FIG. 4) where injector variability is high. A fuel injection profile may be updated by adjusting one or more of a split ratio of port injected fuel to direct injected fuel, a number of direct injections, as well as a split ratio of direct injected fuel (FIGS. 5-11).

FIG. 1 depicts an example of a combustion chamber or cylinder of internal combustion engine 10 coupled in vehicle 5. In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

In some examples, direct fuel injector 166 may be solenoid controlled wherein an amount of fuel delivered by the injector may be adjusted by varying a pulse width signal commanded to the solenoid coupled to the fuel injector. The inventors herein have recognized that solenoid controlled direct injectors may have unpredictable flow characteristics in the transition region of the direct fuel injector, between the ballistic and full lift regions of injector operation. Specifically, in this region, the flow rate of the fuel injector may be inaccurate and unpredictable, causing shot-to-shot as well as part-to-part variability. To reduce cylinder torque output imbalances as well as unwanted tail pipe emissions caused due to the injector variability, an engine controller may operate the direct injector outside of the transition region. As elaborated with reference to FIG. 2, an engine controller may determine a fuel injection profile including a fuel mass to be delivered via the direct injector, as well as a number of direct injections on a given fuel injection event, as well as s split ratio of fuel in each of the number of direct injections. Pulse width signals may then be determined for each of the injections. If the pulse width signal for any of the direct injections falls in the transition region of the direct injector, the fuel injection profile may be updated. In particular, the pulse width signals for all of the direct injections may be adjusted to operate the direct injector outside the transition region. For example, a fuel mass on a given direct injection may be increased or decreased, the number of direct injections may be increased or decreased, and/or a split ratio of fuel in the direct injections may be increased or decreased.

Returning to FIG. 1, fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

The controller 12 receives signals from the various sensors of FIG. 1 and employs the various actuators of FIG. 1 to adjust engine operation based on the received signals and instructions stored on a memory of the controller. For example, the controller may adjust a fuel pulse width signal commanded to the direct fuel injector to operate the direct injector outside of a transition region of the injector.

In this way, the components of FIG. 1 enables an engine system comprising an engine cylinder; a direct injector for fueling the cylinder; and a controller with computer readable instructions stored on non-transitory memory for: estimating an initial fuel injection profile for a combustion cycle of the cylinder based on engine speed-load and engine temperature, the initial fuel injection profile including multiple direct injection fuel pulses, at least one of the multiple direct injection fuel pulses having a pulse-width in a transition region of the direct injector; during a first condition, modifying the initial fuel injection profile to a first modified fuel injection profile having a smaller number of multiple direct injection fuel pulses, each of the smaller number of multiple direct injection fuel pulses having a smaller pulse-width in a lift region of the direct injector; and during a second condition, modifying the initial fuel injection profile to a second modified fuel injection profile wherein the pulse-width of a first set of the multiple direct injection fuel pulses is reduced into a ballistic region of the direct injector while the pulse-width of a second set of the multiple direct injection fuel pulses in raised into the full lift region of the direct injector, while maintaining a number of multiple direct injection fuel pulses, wherein a total direct injected fuel mass in each of the first and second modified fuel injection profile is same as the fuel mass in the initial fuel injection profile. In one example, during the first condition, the fuel masses may be merged if a solution cannot be found by adjusting the fuel mass because the ballistic injection is below the minimum pulse width of the fuel injector. There must be a minimum pulse width in the ballistic region because at some point the small fuel pulses are too inaccurate shot to shot and injector to injector and the risk of the injector not opening may increase. The multiple direct injection fuel pulses of the initial fuel injection profile may include an initial number of direct injection fuel pulses, and wherein the modifying during each of the first and second condition is based on the initial number of direct injection fuel pulses, and further based on the pulse-width of the at least one of the multiple direct injection pulses relative to an upper pulse-width limit of the ballistic region and a lower pulse-width limit of the lift region. The system may further comprise a port injector for fueling the cylinder, wherein the controller includes further instructions for: during a third second condition, modifying the initial fuel injection profile to a third modified fuel injection profile including adjusting the total direct injected fuel mass to move the pulse-width of the at least one of the multiple direct injection fuel pulses out of the transition region of the direct injector, and adjusting a port injected fuel mass based on the adjusted direct injected fuel mass.

The components of FIG. 1 further enable an engine system, comprising: an engine cylinder; a direct injector for fueling the cylinder; a port injector for fueling the cylinder; and a controller with computer readable instructions stored on non-transitory memory for: estimating an initial fuel injection profile for a combustion cycle of the cylinder based on engine speed-load and engine temperature, the initial fuel injection profile including an initial split ratio of direct injected fuel to port injected fuel delivered via multiple direct injection fuel pulses, at least one of the multiple direct injection fuel pulses having a pulse-width in a transition region of the direct injector; and modifying the initial fuel injection profile to change the split ratio of direct injected fuel to port injected fuel so that the at least one of the multiple direct injection fuel pulses is moved out of the transition region. The modifying may include increasing or decreasing a port injected fuel mass relative to a total direct injected fuel mass based on the pulse-width of the at least one of the multiple direct injection pulses relative to an upper pulse-width limit of a ballistic region and a lower pulse-width limit of a lift region of the direct injector. The decreasing the total direct injected fuel mass may include decreasing a number of the multiple direct injection fuel pulses to move the pulse-width of each of the decreased number of direct injection fuel pulses into the lift region, and wherein increasing the total direct injected fuel mass includes increasing the number of the multiple direct injection fuel pulses to move the pulse-width of each of the increased number of direct injection fuel pulses into the ballistic region.

Figure 2:
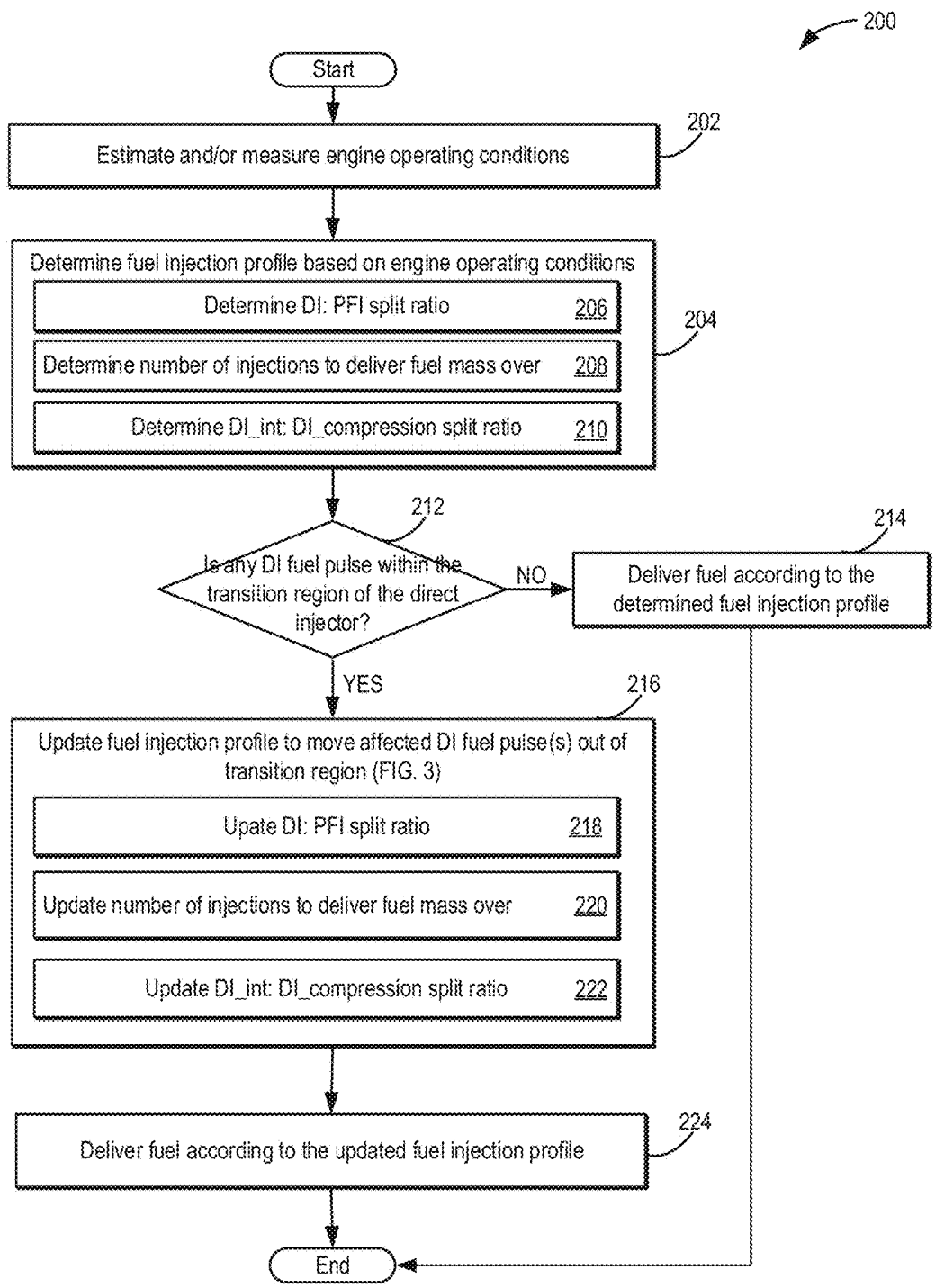
FIG. 2 shows a high level flow chart of an example method for adjusting a fuel injection profile to move direct injector operation outside of a transition region.

Turning now to FIG. 2, an example method 200 for revising a fuel injection profile to operate a direct injector outside of its transition region is shown. The method of FIG. 2 may be included in the system of FIG. 1 as executable instructions stored in non-transitory memory. Further, the method of FIG. 2 may provide the operating sequence of FIGS. 5-11. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. These may include, for example, engine speed, engine load, engine temperature (for example, as inferred from an engine coolant temperature), exhaust temperature, catalyst temperature (Tcat), desired torque, boost level, dilution demand, etc.

At 204, the method includes determining an initial fuel injection profile based on the estimated engine operating conditions. Determining the initial fuel injection profile includes, at 206, determining an overall split ratio of fuel to be delivered via direct injection (DI) relative to port fuel injection (PFI). The controller may determine a total fuel mass to deliver on a given combustion cycle based on the driver torque demand, and engine speed-load, and then determine which proportion of that total fuel mass is to be delivered via the direct injector relative to the port injector. As one example, during an engine cold-start, where the engine coolant temperature estimated before combustion is initiated in the engine is lower than a threshold (such as lower than a light-off temperature of an exhaust catalyst), a larger proportion of the fuel mass may be delivered as a port injection relative to a direct injection (for at least a number of combustion events since the engine start from rest) so as to reduce direct injection induced particulate matter emissions and cold-start engine roughness. In comparison, during an engine hot-start, where the engine coolant temperature estimated before combustion is initiated in the engine is higher than the threshold, a larger proportion of the fuel mass may be delivered as a direct injection relative to a port injection (for at least a number of combustion events since the engine start from rest) so as to leverage the higher performance and charge cooling effect of the direct injection. It will be appreciated that in other examples, all of the commanded fuel mass may be delivered via port injection only or via direct injection only.

In another example, the initial fuel injection profile may be based on combustion chamber temperature. Large DI injections (such as where the DI fuel mass is higher than a threshold amount) may hit the wall/piston of a combustion chamber and create particulate emissions. Thus, when the combustion chamber temperature is higher, the split ratio may be adjusted to reduce the portion of DI fuel mass and increase the portion of PFI fuel mass. As yet another example, the maximum flow limits of the injectors may be considered in the initial fuel injection profile, especially when fuel from both injectors is needed to deliver the total fuel mass required to start the engine, while the injectors are cold. This may be especially true when dealing with increased fuel ethanol percentages. In still another example, an engine start time may be considered in determining the initial fuel injection profile. The DI injector can inject during the compression stroke which enables the engine to start on an earlier cylinder which reduces start time. Therefore when shorter start times are required, a larger portion of the total fuel mass may be delivered via direct injection. As still another example, the flow rate of the High Pressure Fuel Pump (HPP) coupled to the direct injectors may be considered when determining the initial fuel injection profile. If the DI injectors might out-flow the HPP, then a larger portion of the total fuel mass may be delivered as PFI at an engine start.

In one example, the amount of fuel to be delivered via port and direct injectors is empirically determined and stored in predetermined look-up tables or functions. For example, one table may correspond to determining port injection amounts and one table may correspond to determining direct injections amounts. The two tables may be indexed to engine operating conditions, such as engine speed and engine load, among other engine operating conditions. Furthermore, the tables may output an amount of fuel to inject via port fuel injection and/or direct injection to engine cylinders at each combustion cycle.

As another example, the controller may make a logical determination (e.g., regarding a pulse width to command to a solenoid of the port and direct fuel injectors) based on logic rules that are a function of parameter engine speed and load, and further based on engine temperature. The controller may then generate a pulse width control signal that is sent to the injector solenoids.

Determining the initial fuel injection profile further includes, at 208, determining the number of injections per combustion cycle to deliver the fuel mass over. For example, one or more of the port injected fuel mass and the direct injected fuel mass may be delivered as multiple injections over a given combustion cycle. In one example, the port injected fuel mass may be delivered as a single port injection while the direct injected fuel mass may be delivered as multiple direct injections on a given combustion cycle. A number of injections of the multiple injections may be determined based on engine operating conditions. For example, the number of direct injections over which the direct injected fuel mass is delivered may be higher (per combustion cycle) during an engine cold-start relative to an engine hot-start. During cold engine starts, the controller may use both PFI and DI injected fuel. The DI injected fuel may be used for expediting catalyst heating. However, since the DI fuel can increase emissions due to particulates coming in contact with the combustion chamber, the DI fuel pulse may be split into multiple injections.

The number of injections may also be based on the fuel mass to be delivered. For example, as the fuel mass to be delivered via the direct injector increases, and exceeds the maximum pulse width of the direct injector, the fuel mass may be split into multiple injections, each having a pulse width at or below the maximum pulse width. Similarly, as the fuel mass to be delivered via the port injector increases, and exceeds the maximum pulse width of the port injector, the fuel mass may be split into multiple injections, each having a pulse width at or below the maximum pulse width. The multiple port injections may include multiple injections in the exhaust stroke (on a closed intake valve), in the intake stroke (on an open intake valve), or a combination thereof. The multiple direct injections may include multiple injections in the intake stroke, in the compression stroke, or a combination thereof.

By splitting the injection into multiple injections, fuel hitting engine components such as the piston and cylinder walls is reduced. When the fuel hits these components, it either washes down the walls, which can damage the engine and put excess fuel into the oil, or it burns and creates particulate emissions. The fuel is split into smaller pulses to avoid this. Compression injections may also be used such that the atomized fuel is near the spark plug when the spark is delivered.

Determining the initial fuel injection profile further includes, at 210, determining the split ratio of fuel over the multiple injections. For example, where the direct injected fuel mass is delivered as a split direct injection including at least one intake stroke injection (DI_int) and at least one compression stroke injection (DI_comp) on a given combustion cycle, the controller may determine the proportion of direct injected fuel mass delivered via the intake stroke injection relative to the compression stroke injection. Similarly, where the direct injected fuel mass is delivered over multiple intake stroke or multiple compression stroke injections on a given engine cycle, the split ratio of direct injected fuel mass in each of the injections may be determined. In one example, during an engine cold-start, the direct injected fuel mass may be delivered as a split direct injection with a larger portion of the direct injected fuel mass delivered in the compression stroke and a smaller portion of the fuel mass delivered in the intake stroke. In another example, during the engine cold-start, the direct injected fuel mass may be delivered as a split compression stroke direct injection with a larger portion of the fuel delivered earlier during a compression stroke of the combustion cycle, and a remaining smaller fraction of the fuel injected later during the compression stroke of the combustion cycle.

The split ratio of the injection, as well as the number of multiple injections of the split injection may be adjusted based on engine operating conditions such as engine temperature at the time of an engine start, ambient temperature, as well as an alcohol content of the injected fuel. In addition, the split ratio and number of injections may be further adjusted based on an exhaust catalyst temperature, PM load of an exhaust PM filter, and soot tendencies of the engine at the engine start. For example, as the alcohol content of the injected fuel increases, the number of compression stroke direct injections may be increased. As another example, as the engine temperature, or the ambient temperature at the time of the engine cold-start decreases, the number of compression stroke injections applied during a first combustion event may be increased. In one example, multiple compression stroke direct injections of an alcohol fuel may be advantageously used to heat the engine and catalyst, thereby expediting catalyst activation and improving engine and catalyst performance under engine cold-start conditions, while at the same time reducing the soot load of the direct injection.

As one example, the controller may determine a control signal to send to the direct and the port fuel injector actuators, such as a pulse width of the signal being determined based on a determination of the engine speed and load, and further based on engine temperature, fuel alcohol content (or fuel octane rating), and engine PM load. The engine speed may be based on the output of a crankshaft sensor, and the engine load may be based on the operator torque demand. The controller may determine the pulse widths to command to each injector through a determination that directly takes into account the engine speed-load and engine temperature, such as increasing the direct injection pulse width with increasing engine speed and engine load. The controller may alternatively determine the pulse width based on a calculation using a look-up table with the input being relative humidity and the output being pulse-width.

It will be appreciated that upon determining the DI:PFI split ratio, the number of injections, and the direct injection split ratio, the controller may determine a fuel pulse width signal to command for each of the injections based on the fuel rail pressure and a fuel mass to be delivered in each injection.

At 212, it may be determined if any of the DI fuel pulses of the determined fuel injection profile are within the transition region of the direct injector (specifically a direct injector operating map). As elaborated with reference to FIG. 4, the transition region is positioned between the ballistic region and lift (or linear) region of the direct injector, and direct injector variability in the transition region is higher than in each of the ballistic region and lift region. Determining if any of the DI fuel pulses are within the transition region of the direct injector may include, for example, determining if the pulse width signal for any of the DI fuel pulses is smaller than an upper threshold corresponding to the lift region of the direct injector, and larger than a lower threshold corresponding to the ballistic region of the direct injector, the upper and lower thresholds selected based on fuel rail pressure. As such, the transition region includes a certain pulse width range at different fuel rail pressures. As the pressure across the DI injector changes, the characteristics of the injector change. Thus the transition region shifts and changes size at different fuel rail pressure. Consequently it must be calibrated for each injector design (e.g., part number), but not for each injector individually. A set of limit sample injectors may be used to calibrate the pulse width ranges at each pressure and then the calibration may be used to cover the entire population of injectors. If none of the DI fuel pulses are in the transition region, the method moves to 214 to deliver fuel according to the determined fuel injection profile, and the method ends.

Figure 4:
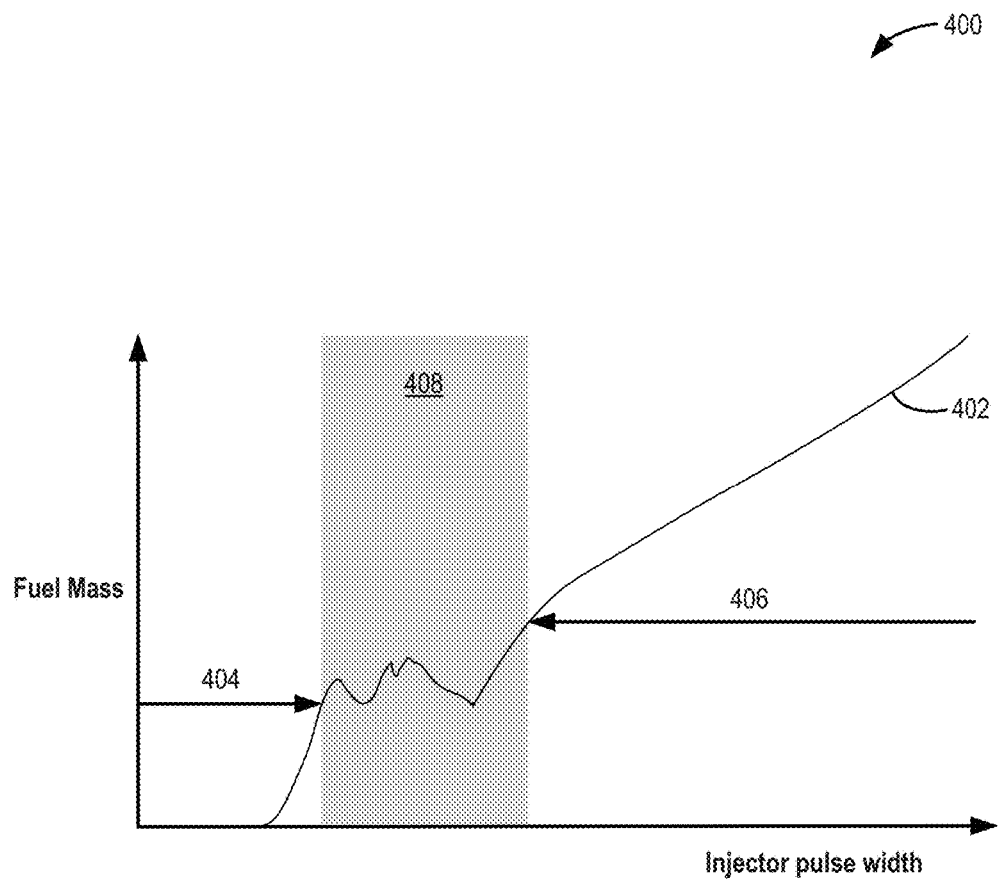
FIG. 4 shows an example direct injector performance map.

Turning briefly to FIG. 4, map 400 depicts an example map 400 of direct injector operating regions. Map 400 depicts injector pulse width along the x-axis and fuel mass along the y-axis. The relationship between a commanded direct injector pulse width and a fuel mass actually delivered is shown at plot 402.

Plot 402 shows the direct injector in its different regions (ballistic, transition, full-lift) as the electrical pulse width applied to the injector increases. At first the injector does not even open, a minimum electrical pulse is required to even open the injector and enable fuel to start flowing. Then the ballistic region is the period of time when the needle is not fully open. In this region, small changes in electrical pulse width result in large changes in fuel mass (due to the slope being very steep in this region). In the transition region, the needle may be bouncing and the fueling may be very unpredictable (shot to shot as well as injector to injector). Then the full lift region always has the same less steep slope, and us is linear. For example, if 1 ms pulse width flows 100 ml, then a 2 ms pulse width will flow 200 ml in the linear region.

At higher commanded fuel pulse widths, the injector is operated in the lift region 406 wherein there is a linear change in fuel mass with commanded pulse width. At very small commanded fuel pulse widths, the injector is operated in the ballistic region 404 wherein there may be some variability. In particular, at very low commanded pulse widths, less than the minimum pulse width of the injector, no fuel is delivered. Thereafter, however, there is a linear change in fuel mass with commanded pulse width. In the region in between the lift and ballistic regions, specifically in the intermediate transition region 408, the injector operates with high variability. For example, based on the position of the pulse width within the transition region, the actual fuel mass delivered may be higher or lower than what was intended. Further, the variability is non-linear and difficult to predict or model, making it difficult to compensate for.

In particular, in the ballistic region, increasing the electric pulse width to the fuel injector increases the amount of mass delivered at a higher rate (steeper slope). While there may be some variability in the increasing, the variability may be mapped and the shape or shift of the slope in the ballistic region can be adjusted to account for the mapped variability. For example, based on the variability, the slope may be made more or less steep. However, in the transition region, an increased pulse width can actually result in the fuel mass injected decreasing. Due to the shape and slope varying drastically in the transition region, both shot-to-shot and injector-to-injector across the population of injectors, it may not be possible to simply shift and reshape the slope of the transition region. The variability is exacerbated due to the slope in the transition region being different for each injector, as well as being significantly different from shot to shot.

As elaborated herein, by updating a fuel injection profile to move a DI fuel pulse out of the transition region, fueling errors, and resulting torque errors and emissions issues, may be reduced. As such, avoiding the transition region of the injector is not as simple as changing the pulse width of an injection to just skip from the end of ballistic region to the start of the full lift region because the fuel mass delivered in region 404 is significantly lower than the fuel mass delivered in region 406. This would cause a sharp jump in the fuel delivered to the engine. Therefore updating the injector pulse width alone may not be sufficient to avoid the transition region. Instead, the fuel mass of each of the injection pulses of the initial fuel injection profile may need to be modified to maintain the total fuel mass delivered to the engine, as elaborated with reference to FIG. 3 and the examples of FIGS. 5-11.

Returning to FIG. 2, if any of the DI fuel pulses of the initially determined fuel injection profile is within the transition region of the direct injector, then at 216, the method includes updating the fuel injection profile to move the affected DI fuel pulse(s) out of the transition region. Updating the fuel injection profile includes, at 218, updating the DI:PFI split ratio. For example, the proportion of total fuel mass delivered via direct injection may be increased while the proportion delivered via port injection is correspondingly decreased. As another example, the proportion of total fuel mass delivered via direct injection may be decreased while the proportion delivered via port injection is correspondingly increased. The controller may estimate an initial ratio of port injected fuel relative to direct injected fuel on a combustion cycle based on engine operating conditions, such as for a cold start of the engine, and then responsive to a direct fuel injection at the initial ratio being in a transition region of a direct injector map, the controller may update the initial ratio to move the direct fuel injection out of the transition region. The updating may be based on a pulse-width of the direct fuel injection relative to each of a ballistic-to-transition border and a lift-to-transition border of the direct injector map. As an example, responsive to a distance of the direct fuel injection pulse-width from the ballistic-to-transition border of the direct injector map being smaller than the distance of the direct fuel injection pulse-width from the lift-to-transition border of the direct injector map, the controller may decrease a direct injected fuel mass to move from the pulse-width from the transition region into the ballistic region of the direct injector map, while increasing a port injected fuel mass. As another example, responsive to a distance of the direct fuel injection pulse-width from the ballistic-to-transition border of the direct injector map being larger than the distance of the direct fuel injection pulse-width from the lift-to-transition border of the direct injector map, the controller may increase the direct injected fuel mass to move from the pulse-width from the transition region into the lift region of the direct injector map, while decreasing the port injected fuel mass. The initial ratio of port injected fuel relative to direct injected fuel may include multiple direct injections on the combustion cycle, and the increasing and decreasing may be based on a number of the multiple direct injections.

As elaborated below, the controller may adjust the number of the multiple direct injections by decreasing the number of the multiple direct injections to move the pulse-width from the transition region into the lift region. Herein, the decreasing may be responsive to the unadjusted number of the multiple direct injections being higher than a threshold. As another example, the controller may adjust the number of the multiple direct injections by increasing the number of the multiple direct injections to move the pulse-width from the transition region into the ballistic region. Herein, the increasing may be responsive to the unadjusted number of the multiple direct injections being lower than a threshold. In one example, the multiple direct injections may include multiple direct injections in an intake stroke and/or a compression stroke of the combustion cycle, and the updating may further include updating a split ratio of direct injected fuel delivered in the intake stroke relative to the compression stroke.

Updating the fuel injection profile may additionally or optionally include, at 220, updating the number of injected to deliver fuel mass over. For example, the total number of direct injections may be increased by splitting some fuel pulses into multiple, smaller fuel pulses. As another example, the total number of direct injections may be decreased by merging some fuel pulses into fewer, larger fuel pulses. Updating the fuel injection profile may additionally or optionally include, at 222, updating the split direct injection ratio of fuel delivered in the multiple direct injection pulses. For example, an amount of the total direct injected fuel mass delivered via a compression stroke direct injection may be increased while the fuel mass delivered via an intake stroke direct injection is decreased. As another example, an amount of the total direct injected fuel mass delivered via a compression stroke direct injection may be decreased while the fuel mass delivered via an intake stroke direct injection is increased. Still further options are possible, as described with reference to the method of FIG. 3 and the examples of FIGS. 5-11. The updating may be performed based on the position of the fuel mass of the DI fuel pulse in the transition region relative to each of the lift region and the ballistic region. In this way, DI fuel pulses may be modified so as to operate the direct injector outside of the transition region, thereby reducing fueling errors, and related issues.

In one example, during a first condition, the controller may update the fuel injection profile by adjusting the fuel mass between the DI injections while maintaining the number of DI injections, because it deviates as little as possible from the base engine calibration. In another example, since reducing the number of DI injections could reduce the effectiveness of the multiple injections on reducing particulate emissions, the number of DI injections may be reduced during a second condition when the exhaust PM load is below a threshold. In yet another example, during a third condition, the DI/PFI split ratio may be modified, however, there may be limits applied for the split ratio adjustment before it may start impacting borderline spark and charge air cooling (power).

In still further examples, a combination of the above-mentioned approaches may be selected. The selection may be based on engine operating conditions such as engine speed and NVH constraints. For example, the engine speed constraints may limit the number of total injections the powertrain control module is capable of injecting. At higher engine speeds, the engine controller may not be able to handle the power dissipation of multiple fuel injections. Therefore at higher engine speeds, the updating of the injection profile may include reducing the number of injections, or, if increasing the number of injections, increasing them by a smaller amount (that is, limiting the increased number of injections). As another example, additional fuel injections can increase ticking noise which can negatively impact customer perceptions. Therefore, when engine ticking noise is already present, the updating of the injection profile may include reducing the number of injections, or, if increasing the number of injections, increasing them by a smaller amount (that is, limiting the increased number of injections).

At 224, fuel is delivered according to the updated fuel injection profile. For example, the controller may determine fuel pulse widths to command based on the updated fuel masses of the various pulses, and then send those signals to the corresponding fuel injectors. The method then ends.

Figure 3:
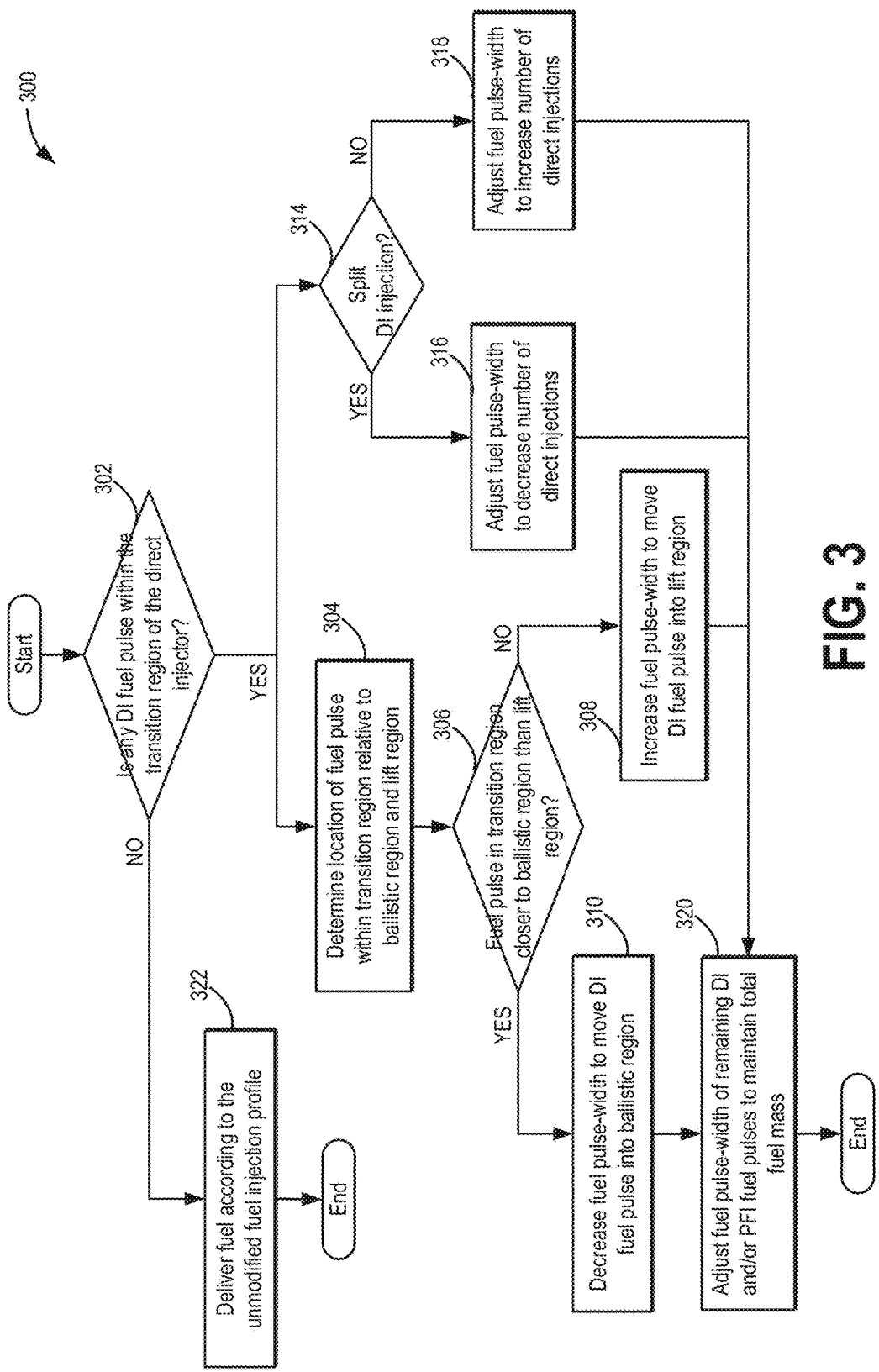
FIG. 3 shows a high level flow chart of an example method for updating a direct injection fuel mass to move direct injector operation outside of the transition region.

Turning now to FIG. 3, an example method 300 for updating a fuel injection profile so as to move a DI fuel pulse out of a transition region of the direct injector is shown. The method of FIG. 3 may be performed as part of the method of FIG. 2, such as at 216.

At 302, the method includes determining if any DI fuel pulse of an initially determined fuel injection profile is within the transition region of a direct injector map. If not, the method moves to 322 to deliver fuel according to the unmodified fuel injection profile. This includes sending pulse width signals to the fuel injectors in accordance with the initial fuel injection profile.

If one or more DI fuel pulses of the initial fuel injection profile are determined to have a fuel pulse width within the transition region, the method proceeds to 304 wherein a location of the affected DI fuel pulse(s) within the transition region of the injector is determined. For example, a distance of the affected DI fuel pulse(s) from each of the ballistic region (specifically, from a border of the transition region and the ballistic region) and the lift region (specifically, from a border of the transition region and the lift region) may be estimated. The controller may refer to a direct injector map, such as the example map of FIG. 4, to estimate the distance.

At 305, it may be determined if the fuel pulse in the transition region is closer to the ballistic region relative to the lift region. For example, a first distance of the fuel pulse from the ballistic-to-transition border may be compared to a second distance of the fuel pulse from a lift-to-transition border. If the first distance is smaller than the second distance, the affected fuel pulse is determined to be closer to the ballistic region. It will be appreciated that each of the DI fuel pulses in the transition region may be similarly assessed.

If the affected DI fuel pulse is closer to the ballistic region of the injector, then at 310, the method includes decreasing the pulse width commanded for the affected DI fuel pulse to move it from the transition region into the ballistic region. As a result of the change in pulse width, the fuel mass delivered in the affected fuel is decreased. In comparison, if the affected DI fuel pulse is closer to the lift region of the injector, such as when the second distance is smaller than the first distance, then at 308, the method includes increasing the pulse width commanded for the affected DI fuel pulse to move it from the transition region into the lift region. As a result of the change in pulse width, the fuel mass delivered in the affected fuel is increased.

In this way, responsive to a distance of the DI fuel pulse (e.g., fuel mass or fuel pulse width of the affected DI fuel pulse) from the ballistic-to-transition border of the direct injector map being smaller than the distance of the affected fuel pulse from the lift-to-transition border of the direct injector map, the controller may decrease the fuel mass of the one of the multiple direct injections to move from the fuel mass from the transition region into the ballistic region of the direct injector map while increasing the fuel mass of another one of the multiple direct injections. In an alternate example, responsive to the distance of the fuel mass from the ballistic-to-transition border of the direct injector map being larger than the distance of the fuel mass from a lift-to-transition border of the direct injector map, the controller may increase the fuel mass of the one of the multiple direct injections to move the fuel mass from the transition region into the lift region of the direct injector map while decreasing the fuel mass of another one of the multiple direct injections. Herein, the increasing and decreasing may be based on a total number of the multiple direct injections in the initial (unmodified) DI fuel injection profile, as well as a proportion of those injections that are in the transition region.

From each of 308 and 310, the method moves to 320 wherein the method includes adjusting a pulse width commanded to each of the remaining DI fuel pulses (that were outside the transition region) and PFI fuel pulses to maintain the total fuel mass. In other words, the total fuel mass delivered via the unmodified fuel injection profile and the modified fuel injection profile remains constant. In still further examples, adjusting the pulse width may include adjusting the direct injected fuel mass to move the affected pulse out of the transition region and then adjusting an amount of fuel delivered to the cylinder on the combustion cycle via port injection based on the updated DI fuel mass to maintain a total fuel mass.

Additionally, or optionally, while adjusting the affected fuel pulses based on their location within the transition region, the method may also move to 314 (from 302) to adjust the number of direct injections. Specifically, at 314, it may be determined if the DI fuel pulse in the transition region is part of a split direct injection. A split direct injection may be confirmed when the DI fuel mass is delivered over multiple intake and/or compression stroke direct injections. As an example, a split direct injection may include 2-4 direct injections which may be any combination of intake stroke and compression stroke direct injections.

If the affected DI fuel pulse is not part of a split direct injection, such as when the DI fuel pulse is a single direct injection of the unmodified fuel injection profile, at 318, the method includes adjusting the fuel pulse width to split the affected DI fuel pulse into multiple smaller DI pulses, each of the multiple smaller DI fuel pulses in the ballistic region of the injector. By increasing the number of fuel pulses, the affected DI fuel pulse is moved out of the transition region and each of the smaller fuel pulses is positioned within the less variable ballistic region.

If the affected DI fuel pulse is part of a split direct injection, such as when the DI fuel pulse is one of multiple direct injections of the unmodified fuel injection profile, at 316, the method includes adjusting the fuel pulse width to merge the affected DI fuel pulse with at least another DI fuel pulse (such as another DI fuel pulse in the transition region, a DI fuel pulse in the ballistic region, or a DI fuel pulse in the lift region) into a larger DI pulse in the lift region of the injector. By increasing the number of fuel pulses, the affected DI fuel pulse is moved out of the transition region and the resulting larger fuel pulse is positioned within the more linear lift region.

Figure 5:
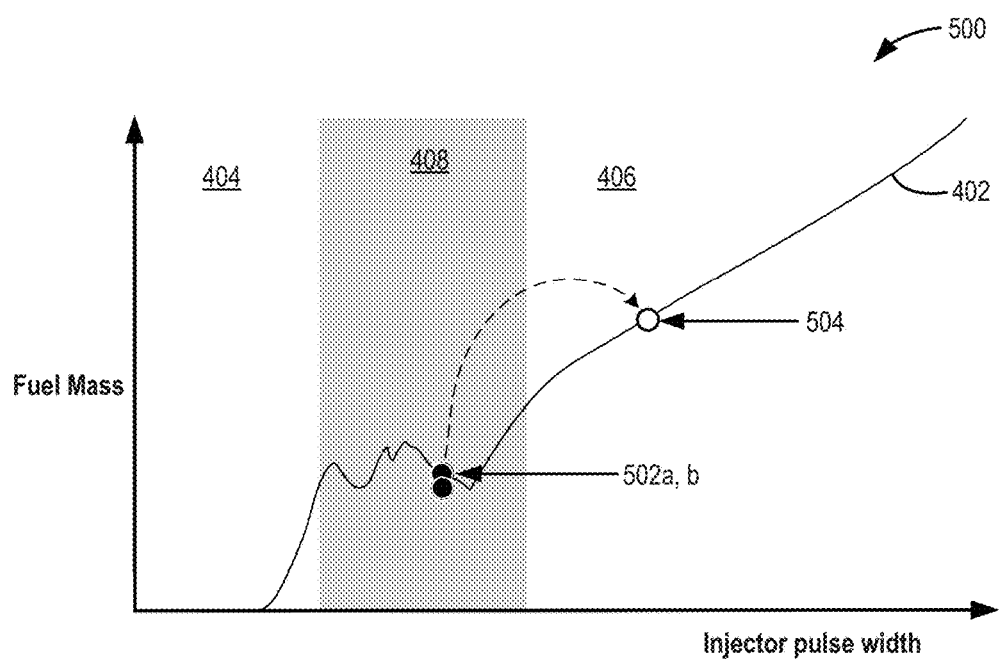
FIGS. 5-6 show an example of operating a direct injector outside the transition region by adjusting a number of direct injections.
Figure 6:
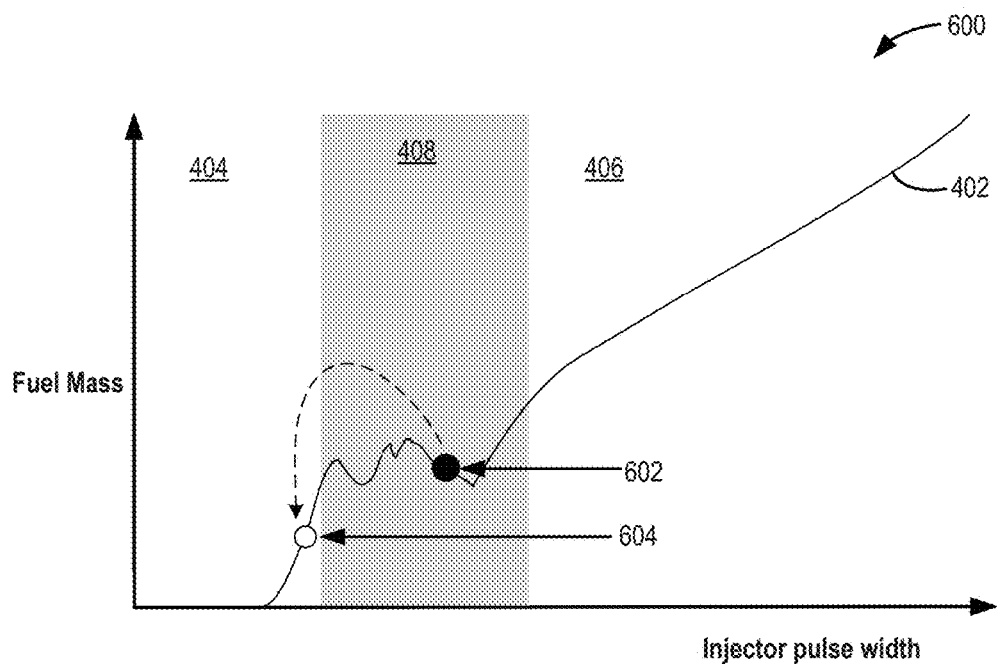

An example of adjusting the number of injections to operate outside the transition region of a direct injector is shown with reference to FIG. 5. Map 500 depicts a direct injector map, such as map 400 of FIG. 4, including a ballistic region 404, lift region 406, and transition region 408. In this example, the initial (unmodified) fuel injection profile includes multiple direct injections per combustion cycle. Map 500 depicts two DI fuel pulses 502 a, b (both having the same fuel mass and therefore the same pulse width) that lie in transition region 408 of the injector map. In alternate examples, DI fuel pulses 502 a, b may be in the transition region and have different fuel masses. To avoid operation in transition region 408, the number of fuel pulses is decreased by merging fuel pulses 502 a, b into a single fuel pulse 504 having a larger fuel mass, and therefore a larger pulse width. In particular, the modified pulse width of fuel pulse 504 lies in lift region 406. In this way, by decreasing the number of direct fuel injections per combustion cycle, direct injector operation is shifted out of the transition region and into the lift region while maintaining direct injection fuel mass.

Another example of adjusting the number of injections to operate outside the transition region of a direct injector is shown with reference to FIG. 5. Map 600 depicts a direct injector map, such as map 400 of FIG. 4, including a ballistic region 404, lift region 406, and transition region 408. In this example, the initial (unmodified) fuel injection profile includes a single direct injection per combustion cycle. Map 600 depicts a single DI fuel pulses 602 that lies in transition region 408 of the injector map. To avoid operation in transition region 408, the number of fuel pulses is increased by splitting fuel pulse 602 into a two fuel pulses 604 a, b, each having a smaller fuel mass and therefore a smaller pulse width. In the depicted example, both fuel pulses 604 a, b have the same fuel mass (and therefore the same pulse width) and lie in ballistic region 404 of the injector map. In alternate examples, DI fuel pulses 604 a, b may be in the ballistic region and have different fuel masses. In this way, by increasing the number of direct fuel injections per combustion cycle, direct injector operation is shifted out of the transition region and into the ballistic region while maintaining direct injection fuel mass.

In this way, during a first condition, the controller may decrease the number of multiple injections by merging the one of the multiple direct injections with at least another of the multiple direct injections to move the fuel mass from the transition region into the lift region. Then, during a second condition, the controller may increase the number of multiple injections by splitting the one of the multiple direct injections into at a plurality of direct injections in the ballistic region. In one example, during the first condition, an unadjusted number of the multiple injections is higher than a threshold number, while during the second condition, the unadjusted number of the multiple injections is lower than the threshold number.

Figure 7:
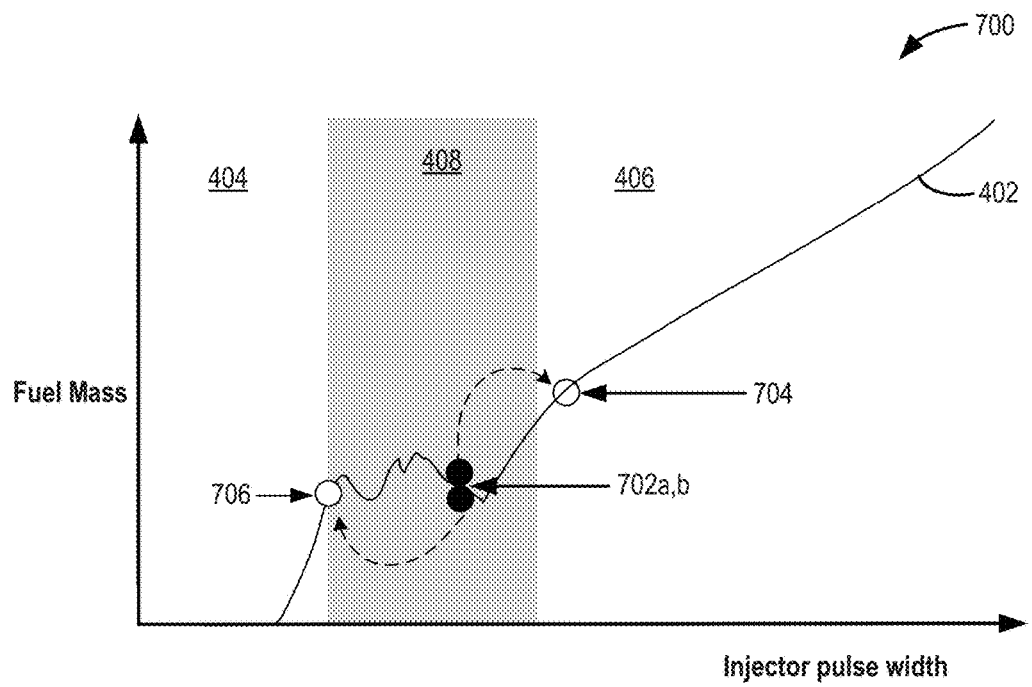
FIGS. 7-8 shows an example of operating a direct injector outside the transition region by adjusting the fuel mass of each injection of multiple direct injections.

An example of adjusting the fuel mass in a fuel injection profile having multiple direct injections to operate outside the transition region of a direct injector is shown with reference to FIG. 7. Map 700 depicts a direct injector map, such as map 400 of FIG. 4, including a ballistic region 404, lift region 406, and transition region 408. In this example, the initial (unmodified) fuel injection profile includes multiple direct injections per combustion cycle. Map 700 depicts two DI fuel pulses 702 a, b (both having the same fuel mass and therefore the same pulse width) that lie in transition region 408 of the injector map. In alternate examples, DI fuel pulses 702 a, b may be in the transition region and have different fuel masses. To avoid operation in transition region 408, the fuel mass in each of pulses 702a and 702b is adjusted while maintaining the overall direct injected fuel mass and also while maintaining the total number of direct injections. Specifically, the fuel mass of pulse 702a is increased to provide modified fuel pulse 704 in the lift region 406 of the injector. At the same time, the fuel mass of pulse 702b is decreased to provide modified fuel pulse 706 in the ballistic region 404 of the injector. In this way, by modifying the fuel mass and pulse width for each of the multiple direct fuel injections per combustion cycle, direct injector operation is shifted out of the transition region.

In one example, an engine controller may modify each of the DI fuel pulses in the transition region based on the proximity of each pulse to the full lift-to-transition region border as well as the ballistic-to-transition region border. The modification may be further based on the total fuel mass to be delivered via direct injection, the total fuel mass of the affected pulse(s) in the transition region, the total number of direct injections and the number of affected injections in the transition region. As one example, the controller may use an algorithm, such as the algorithm 800 depicted at FIG. 8 and elaborated below to modify the fuel mass of each fuel pulse.

Figure 8:
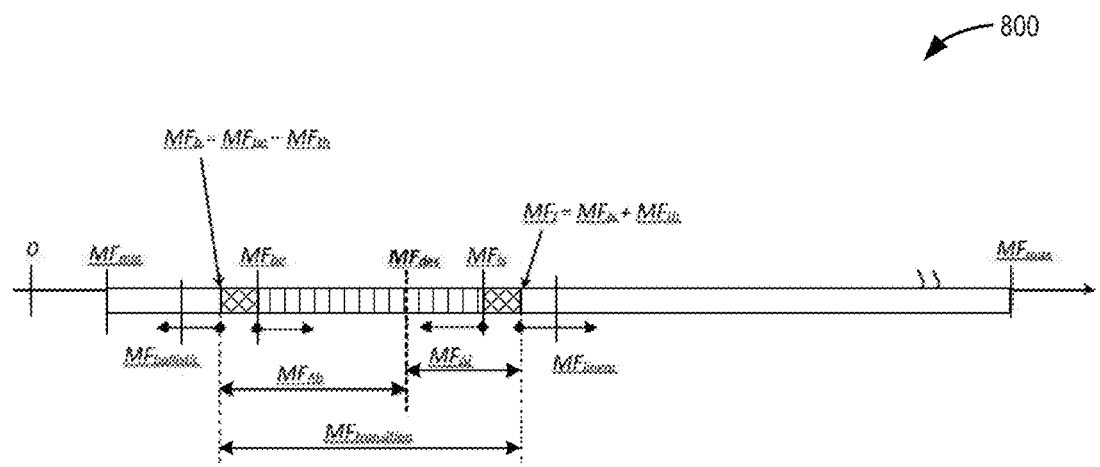

The controller starts with an overall desired fuel mass to be injected (via direct injection), determined in FIG. 8 as MFdes×Ndes, where MFdes is the desired fuel mass to be injected per injection and Ndes is the desired number of injections. The controller then transposes the overall desired fuel mass (MFdes×Ndes) in the same number of direct injection fuel pulses split between ballistic and lift region injections. Assuming MFbe represents the "ballistic end" fuel mass, MFls represents the "linear start" fuel mass (fuel mass in lift region), and MFth represents a calibratable hysteresis for the transition region, the following equations should hold true:

$$Nde s=Nb+Nl;$$

$$MFdes \times Ndes = MFlinear \times Nl + MFballistic \times Nb;$$

where MFlinear and MFballistic are the modified fuel masses for the injections scheduled in the lift region (herein also referred to as linear region) and ballistic regions, and Nl and Nb are a number of pulses in each region, respectively.

In this way, a fuel mass delivered in each DI fuel pulse can be modified to operate the direct injector outside the transition region while maintaining the overall fuel mass and the overall number of direct injections.

In one example, the multiple direct injections of the unmodified fuel injection profile may include multiple direct injections in an intake stroke and/or a compression stroke of the combustion cycle. Herein, updating the fuel mass may include updating a split ratio of direct injected fuel delivered in the intake stroke relative to the compression stroke. Further, a number of intake stroke and compression stroke injections may be varied.

Figure 9:
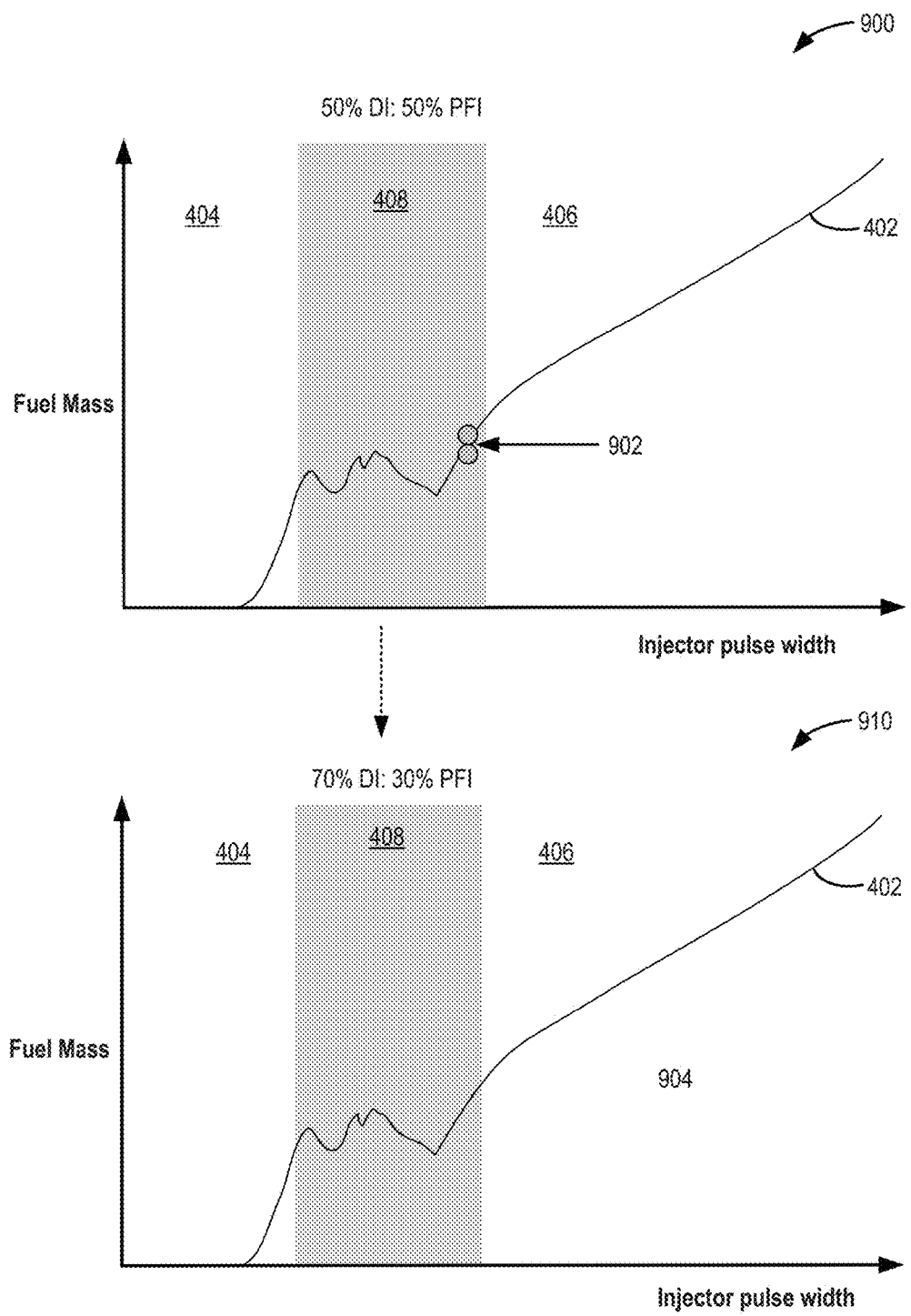
FIGS. 9-10 show an example of operating a direct injector outside the transition region by adjusting the split ratio of fuel delivered via direct injection relative to port injection.

An example of adjusting the split ratio of fuel delivered via direct injection relative to port injection to operate outside the transition region of a direct injector is shown with reference to FIG. 9. An unmodified direct injector map 900 and a modified direct injector map 910 are shown. Maps 900 and 910, similar to map 400 of FIG. 4, include a ballistic region 404, lift region 406, and transition region 408.

In this example, the initial (unmodified) fuel injection profile includes an initial split ratio of 50% DI: 50% PFI with multiple direct injections per combustion cycle. Map 900 depicts two DI fuel pulses 902 (both having the same fuel mass and therefore the same pulse width) that lie in transition region 408 of the injector map and that together constitute the 50% DI of the initial fuel injection profile. In alternate examples, DI fuel pulses 902 may be in the transition region and have different fuel masses. DI fuel pulses 902 are in the transition region 408, proximate to a border of the transition region with the lift region 406. To avoid operation in transition region 408, the split ratio of DI:PFI fuel is adjusted by changing the DI percentage. In particular, since the DI fuel pulses are closer to the lift region 406 (versus the ballistic region 404), the percentage of total fuel delivered via DI is increased from 50% to 70% to move the DI fuel pulses out of the transition region, as indicated by modified pulses 904 in the lift region. At the same time, the total fuel mass is maintained by reducing the PFI percentage from 50% to 30%. In this way, by increasing the percentage of fuel delivered via direct injection relative to port injection on a given combustion cycle, direct injector operation is shifted out of the transition region.

Figure 10:
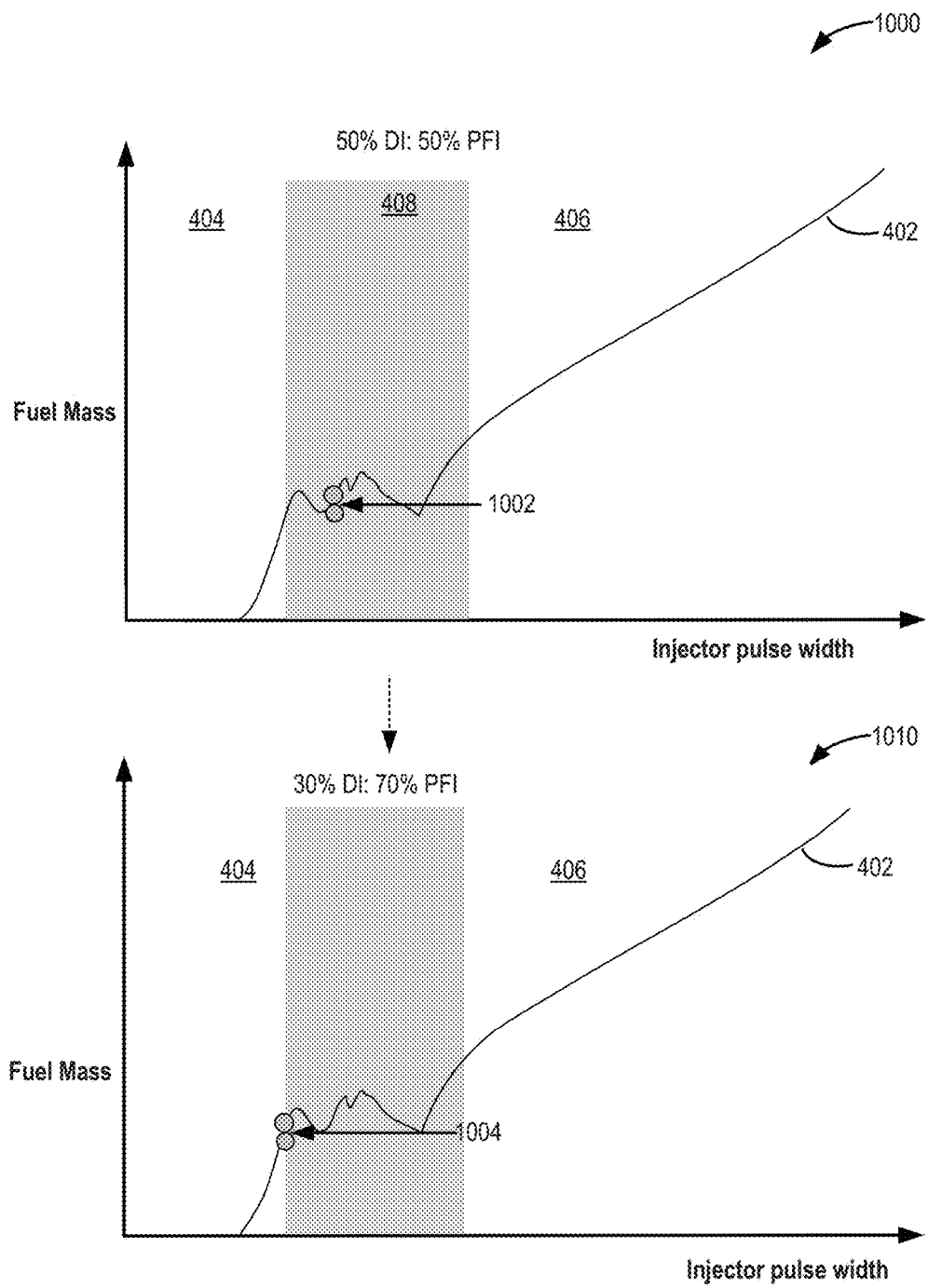

Another example of adjusting the split ratio of fuel delivered via direct injection relative to port injection to operate outside the transition region of a direct injector is shown with reference to FIG. 10. An unmodified direct injector map 1000 and a modified direct injector map 1010 are shown. Maps 1000 and 1010, similar to map 400 of FIG. 4, include a ballistic region 404, lift region 406, and transition region 408.

In this example, the initial (unmodified) fuel injection profile includes an initial split ratio of 50% DI: 50% PFI with multiple direct injections per combustion cycle. Map 1000 depicts two DI fuel pulses 1002 (both having the same fuel mass and therefore the same pulse width) that lie in transition region 408 of the injector map and that together constitute the 50% DI of the initial fuel injection profile. In alternate examples, DI fuel pulses 1002 may be in the transition region and have different fuel masses. DI fuel pulses 1002 are in the transition region 408, proximate to a border of the transition region with the ballistic region 404. To avoid operation in transition region 408, the split ratio of DI:PFI fuel is adjusted by changing the DI percentage. In particular, since the DI fuel pulses are closer to the ballistic region 404 (versus the lift region 406), the percentage of total fuel delivered via DI is decreased from 50% to 30% to move the DI fuel pulses out of the transition region, as indicated by modified pulses 1004 in the ballistic region. At the same time, the total fuel mass is maintained by increasing the PFI percentage from 50% to 70%. In this way, by decreasing the percentage of fuel delivered via direct injection relative to port injection on a given combustion cycle, direct injector operation is shifted out of the transition region.

It will be appreciated that while the examples of FIGS. 5-10 depict the adjusting of one of a number of injections, a DI:PFI split ratio, and a fuel mass of multiple direct injections, this is not meant to be limiting. In still further examples, various combinations of the above described approaches may be used. For example, during selected conditions, the number of direct injections and the DI:PFI split ratio may be modified. As another example, during other conditions, each of the number of injections, the DI:PFI split ratio, and the fuel mass of the multiple direct injections may be modified.

For example, during a first condition, responsive to a pulse-width signal of a single direct injection fuel pulse of a combustion cycle lying within a transition region of a direct injector, the controller may shift to operating with multiple direct injection fuel pulses on the combustion cycle, the pulse-width signal of each of the multiple direct injection fuel pulses lying outside the transition region. In comparison, during a second condition, responsive to the pulse-width signal of one of multiple direct injection fuel pulses of the combustion cycle lying within the transition region of the direct injector, the controller may shift to operating with a single direct injection fuel pulse on the combustion cycle, the pulse-width signal of the single direct injection fuel pulse lying outside the transition region. In one example, during the first condition, the pulse-width signal of each of the multiple direct injection fuel pulses is in a ballistic region of the direct injector, while during the second condition, the pulse-width signal of the single direct injection fuel pulse is in a lift region of the direct injector. In a further example, during each of the first and the second condition, a total fuel mass delivered via direct injection on the combustion cycle is maintained. Further, during a third condition, responsive to the pulse-width signal of the one of the multiple direct injection fuel pulses of the combustion cycle lying within the transition region of the direct injector, the controller may adjust the pulse-width signal of each of the multiple direct injection fuel pulses to shift out of the transition region while maintaining a number of pulses of the multiple direct injection fuel pulses.

As one example, the first condition wherein the number of injections is increased includes the engine operating at a lower engine speed and/or lower PM load, the second condition wherein the number of injections is reduced includes the engine operating at a higher speed, a higher PM load, and/or at least one of the multiple injections in the ballistic region being too small (e.g., smaller than or at a minimum pulse-width of the injector) and the third condition includes PM load being above a threshold and/or engine NVH being above a threshold. The shifting and adjusting during each of the first, second, and third condition may include, for example, adjusting a total fuel mass delivered via direct injection on the combustion cycle, the method further comprising, adjusting a fuel mass delivered via port injection on the combustion cycle based on the adjusted total fuel mass delivered via direct injection.

In still another example, during a first condition, the controller may modify an initial fuel injection profile to a first modified fuel injection profile having a smaller number of multiple direct injection fuel pulses, each of the smaller number of multiple direct injection fuel pulses having a smaller pulse-width in a lift region of the direct injector, while during a second condition, the controller may modify the initial fuel injection profile to a second modified fuel injection profile wherein the pulse-width of a first set of the multiple direct injection fuel pulses is reduced into a ballistic region of the direct injector while the pulse-width of a second set of the multiple direct injection fuel pulses in raised into the lift region of the direct injector, while maintaining a number of multiple direct injection fuel pulses. Herein a total direct injected fuel mass in each of the first and second modified fuel injection profile may be same as the fuel mass in the initial, unmodified fuel injection profile. As an example, the first condition may include one or more of a higher engine speed and a higher PM load while the second condition includes one or more of a lower engine speed, a higher engine NVH, and at least one of the injections of the initial fuel injection profile operating at or around the minimum pulse-width of the injector. The multiple direct injection fuel pulses of the initial fuel injection profile may include an initial number of direct injection fuel pulses, and the modifying during each of the first and second condition may be based on the initial number of direct injection fuel pulses, and further based on the pulse-width of the at least one of the multiple direct injection pulses relative to an upper pulse-width limit of the ballistic region and a lower pulse-width limit of the lift region. Further still, during a third second condition, the controller may modify the initial fuel injection profile to a third modified fuel injection profile including adjusting the total direct injected fuel mass to move the pulse-width of the at least one of the multiple direct injection fuel pulses out of the transition region of the direct injector, and adjusting a port injected fuel mass based on the adjusted direct injected fuel mass.

In still another example, during a first condition, responsive to a pulse-width of one of multiple direct injection fuel pulses of a combustion cycle lying within a transition region of a direct injector map, the controller may reduce a number of the multiple direct injection fuel pulses while maintaining a split ratio of direct injected to port injected fuel; while during a second condition, responsive to the pulse-width of the one of the multiple direct injection fuel pulses of the combustion cycle lying within the transition region of the direct injector, the controller may adjust the split ratio of direct injected to port injected fuel. As an example, adjusting the split ratio may include, when more fuel mass is needed in the ballistic DI injection because it is smaller than the minimum allowed pulse width of that injector, increasing the split ratio of direct injected fuel to port injected fuel over the combustion cycle. In another representation, rather than splitting the DI pulse into the ballistic and linear regions, the pulse is split into two ballistic injections and then the remaining mass is put into the PFI system, thereby changing both the number of DI injections and decreasing the split ratio of direct injected fuel to port injected fuel over the combustion cycle. Adjusting the split ratio may also include maintaining the number of multiple direct injection fuel pulses in the combustion cycle. Alternatively, adjusting the split ratio may include adjusting the number of multiple direct injection fuel pulses in the combustion cycle, as well as a fuel mass delivered in each of the multiple direct injection fuel pulses. In one example, during the first condition, the pulse-width of each of the reduced number of multiple direct injection fuel pulses is in a full lift region of the direct injector. The number of pulses in DI can be maintained by adding more fuel to avoid the minimum pulse width or by taking away fuel so all the DI injectors can be in the ballistic region. In another representation, the number of DI pulses could be decreased and the additional mass could be put in the PFI system. In yet another representation, the number of DI pulses could be increased by taking fuel from the PFI system to put into the DI system, thereby both increasing the number of DI injections and increasing the split ratio of direct injected fuel to port injected fuel over the combustion cycle.

Figure 11:
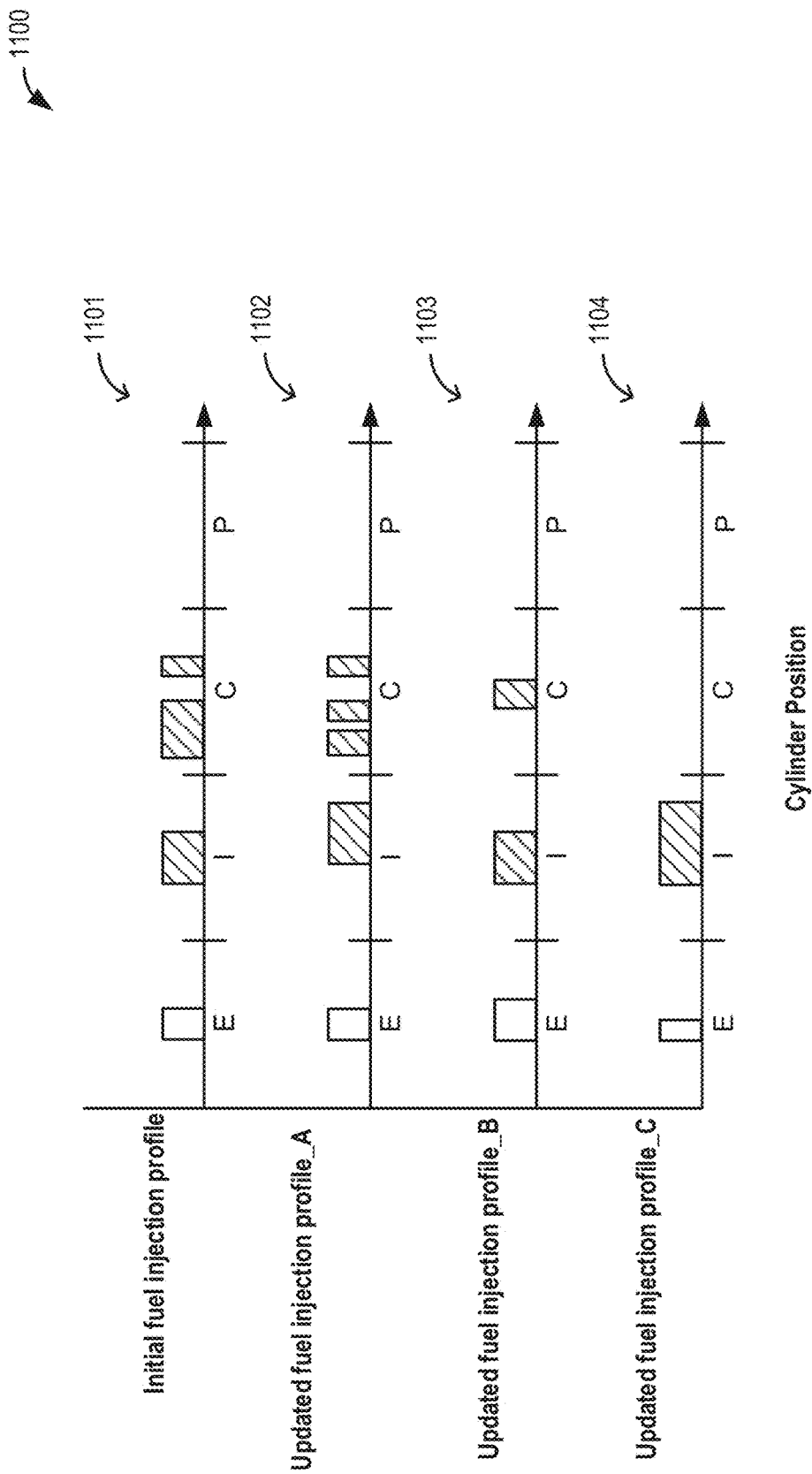
FIG. 11 shows example fuel injection profiles that may be applied to operate a direct injector outside the transition region.

Example modified fuel injection profiles where multiple different adjustments may be applied to move a direct injection fuel pulse outside of the transition region are shown with reference to FIG. 11. Map 1100 of FIG. 11 shows example fuel injection profiles 1102-1104 that may be used during engine operation responsive to an initial fuel injection profile 1101 having a DI fuel pulse that lies within the transition region of a direct injector's operating map. Each injection profile depicts a timing of injection relative to a cylinder piston position, or cylinder stroke. Based on the position of the cylinder's piston at any time in the engine cycle, fuel may be injected into the cylinder during an intake stroke (I), a compression stroke (C), a power stroke (P), or an exhaust stroke (E). The injection profile further depicts whether fuel was injected via port injection (hatched blocks), single or multiple direct injections (striped blocks), or both.

An initial fuel injection profile may be determined based on engine operating conditions including engine speed, driver torque demand, engine temperature, and fuel alcohol content. In one example, the initial fuel injection profile may be an engine cold-start fuel injection profile. The initial fuel injection profile includes, on a given combustion cycle, injecting a portion of fuel as a port injection (hatched block) during a closed intake valve event (that is, during an exhaust stroke of a previous cylinder combustion event) while a remaining portion of the fuel is injected as an intake stroke direct injection and two compression stroke direct injections (diagonally striped blocks). The injection amounts may be adjusted such that 35% of the fuel injection may be delivered as a port injection during a closed intake valve event (e.g., during an exhaust stroke), another 35% of the fuel injection may be delivered as an intake stroke direct injection, while a remaining 30% of the fuel injection is delivered as the multiple compression stroke direct injections. Herein, the fuel mass in the second (latest in the combustion cycle) compression stroke injection may correspond to a pulse width that lies in the transition region of the direct injector.

To avoid the transition region, the initial fuel injection profile may be updated to a first modified fuel injection profile (Updated fuel injection profile A) wherein the number of compression stroke direct injections are increased by splitting the first (earlier in the combustion cycle) compression stroke DI pulse into two smaller compression stroke DI pulses. In addition, the overall amount of DI fuel delivered in the compression stroke is reduced while the amount of DI fuel delivered in the intake stroke is correspondingly increased. No changes are made to the proportion of fuel delivered via port injection, allowing the overall DI:PFI ratio to be maintained. Thus, in this example, by increasing the number of direct injections, as well as by changing the ratio of fuel mass delivered in each of the direct injections, the compression stroke DI fuel pulse that was predicted to be in the transition region is moved into the ballistic region. In one example, the first modified fuel injection profile may be selected responsive to the injection mode. If the engine is in a mode that requires catalyst heating, then the DI compression injection size and injection timing are very important. Other fueling parameters such as DI intake fuel mass can be adjusted without impacting the emissions as much as if the DI compression injection was changed.

To avoid the transition region, the initial fuel injection profile may be alternatively be updated to a second modified fuel injection profile (Updated fuel injection profile B) wherein the number of compression stroke direct injections are decreased by merging the first and second compression stroke DI pulses into a single compression stroke DI pulse while also reducing the total amount of fuel delivered in the compression stroke. The amount of DI fuel delivered in the intake stroke is increased by a small amount until the maximum pulse width of the direct injector is reached. The remaining fuel mass adjustment is made by increasing the proportion of fuel delivered via port injection, causing the overall DI:PFI ratio to be decreased. Thus, in this example, by decreasing the number of direct injections, as well as by changing the ratio of fuel mass delivered in each of the direct injections, and decreasing the ratio of DI:PFI fuel, the compression stroke DI fuel pulse that was predicted to be in the transition region is moved into the ballistic region. In one example, the second modified fuel injection profile may be selected responsive to maintaining the same fuel to air control. If fuel mass needs to be moved out of the DI injections in order to ensure the DI pulses are not in the transition region, then the PFI may be increased in response to that.

To avoid the transition region, the initial fuel injection profile may be alternatively be updated to a third modified fuel injection profile (Updated fuel injection profile_C) wherein the number of compression stroke direct injections are decreased by merging the first and second compression stroke DI pulses with the intake stroke DI fuel pulse to provide a single intake stroke DI pulse while also increasing the total amount of fuel delivered via direct injection. The proportion of fuel delivered via port injection is correspondingly decreased, causing the overall DI:PFI ratio to be increased. Thus, in this example, by decreasing the number of direct injections, as well as by changing the ratio of fuel mass delivered in each of the direct injections, and increasing the ratio of DI:PFI fuel, the compression stroke DI fuel pulse that was predicted to be in the transition region is moved into the ballistic region. In one example, the third modified fuel injection profile may be selected responsive to maintain the same fuel to air control and the driver demanded torque at higher loads where DI charge air cooling is needed.

In another example, at higher engine loads, such as when more power, more air charge cooling, or advanced spark is needed, the controller may increase the split ratio of direct injected fuel to port injected fuel over the combustion cycle. In comparison, at lower engine loads, such as when PM load or exhaust emissions are above a threshold load, the controller may decrease the split ratio of direct injected fuel to port injected fuel over the combustion cycle.

In still other examples, the controller may continue adjusting the fuel mass until a solution cannot be found which puts the pulses in the full lift and ballistic regions. At that point, the number of injectors may be reduced by one and a solution is determined. The controller may reiteratively adjust the number if pulses and then the number of injectors until the profile is down to 1 injection. If that injection is still in the transition region, then the DI/PFI split ratio may be changed (e.g., increased or decreased) to move the DI injection out of the transition region.

In still another example, the controller may merge fuel pulses when there is no option that allows the number of injections to be maintained while redistributing them between the ballistic and full lift regions. As such, the controller may prioritize maintaining the number of pulses and redistributing the fuel masses into the full lift and transition regions. If a solution is not possible because the injection in the ballistic region is below the minimum pulse width of the injector, then the number of pulses may be reduced so that full lift injections are possible.

Further still, when more direct injected fuel mass is needed allow the controller to split the transition region injections into ballistic and full lift region injections, the controller may increase the split ratio of direct injected fuel to port injected fuel over the combustion cycle. In comparison, when less direct injected fuel mass is needed to move an injection out of the transition region (for example, because the number of DI injectors has been decreased), the controller may decrease the split ratio of direct injected fuel to port injected fuel over the combustion cycle.

In this way, direct injector variability is reduced, allowing gaseous and particulate emissions to be reduced. For example, gaseous and particulate emissions may be reduced without reducing the number of multiple injections on a dual fuel engine (PFDI). The technical effect of adjusting one or more of a number, fuel mass, and split ratio of a direct injection fuel pulse based on a position of the fuel pulse relative to a transition region of a direct injector is that direct injection may be provided outside of the highly variable transition region while maintaining an overall fuel mass to be injected on a given combustion cycle. Further, the amount of calibration effort required by the engine is reduced relative to the effort that would have been required to map the fuel mass split between fuel pulses in a feed-forward manner. As a result of operating outside the inaccurate transition region of the direct injector, engine air-fuel ratio and torque errors may be reduced, improving drivability.

One example method for an engine comprises: delivering fuel to a cylinder on a combustion cycle as multiple direct injections; and responsive to a fuel mass of one of the multiple direct injections being in a transition region of a direct injector map, updating one or more of a ratio of fuel delivered in each of the multiple direct injections and a number of the multiple injections to move the fuel mass of the one of the multiple direct injections out of the transition region. In the preceding example, additionally or optionally, the transition region is positioned between a ballistic region and a lift region of the direct injector map, and wherein direct injector variability in the transition region is higher than each of the ballistic region and the lift region. In any or all of the preceding examples, additionally or optionally, the updating is based on a position of the fuel mass relative to each of a ballistic-to-transition border and a lift-to-transition border of the direct injector map. In any or all of the preceding examples, additionally or optionally, the updating includes, responsive to a distance of the fuel mass from the ballistic-to-transition border of the direct injector map being smaller than the distance of the fuel mass from the lift-to-transition border of the direct injector map, decreasing the fuel mass of the one of the multiple direct injections to move from the fuel mass from the transition region into the ballistic region of the direct injector map while increasing the fuel mass of another one of the multiple direct injections. In any or all of the preceding examples, additionally or optionally, the updating further includes, responsive to the distance of the fuel mass from the ballistic-to-transition border of the direct injector map being larger than the distance of the fuel mass from a lift-to-transition border of the direct injector map, increasing the fuel mass of the one of the multiple direct injections to move the fuel mass from the transition region into the lift region of the direct injector map while decreasing the fuel mass of another one of the multiple direct injections. In any or all of the preceding examples, additionally or optionally, the increasing and decreasing is based on a number of the multiple direct injections. In any or all of the preceding examples, additionally or optionally, updating the number of injections of the multiple direct injections includes during a first condition, decreasing the number of multiple injections by merging the one of the multiple direct injections with at least another of the multiple direct injections to move the fuel mass from the transition region into the lift region; and during a second condition, increasing the number of multiple injections by splitting the one of the multiple direct injections into at a plurality of direct injections in the ballistic region. In any or all of the preceding examples, additionally or optionally, during the first condition, an unadjusted number of the multiple injections is higher than a threshold number, and wherein during the second condition, the unadjusted number of the multiple injections is higher than the threshold number. In any or all of the preceding examples, additionally or optionally, the multiple direct injections include multiple direct injections in an intake stroke and/or a compression stroke of the combustion cycle, and wherein the updating further includes updating a split ratio of direct injected fuel delivered in the intake stroke relative to the compression stroke. In any or all of the preceding examples, additionally or optionally, the method further comprises, adjusting an amount of the fuel delivered to the cylinder on the combustion cycle via port injection based on the updating. In any or all of the preceding examples, additionally or optionally, the method may be implemented in a hybrid vehicle system.

Another example method comprises: during a first condition, responsive to a pulse-width signal of a single direct injection fuel pulse of a combustion cycle lying within a transition region of a direct injector, shifting to operating with multiple direct injection fuel pulses on the combustion cycle, the pulse-width signal of each of the multiple direct injection fuel pulses lying outside the transition region; and during a second condition, responsive to the pulse-width signal of one of multiple direct injection fuel pulses of the combustion cycle lying within the transition region of the direct injector, shifting to operating with a single direct injection fuel pulse on the combustion cycle, the pulse-width signal of the single direct injection fuel pulse lying outside the transition region. In the preceding example, additionally or optionally, during the first condition, the pulse-width signal of each of the multiple direct injection fuel pulses is in a ballistic region of the direct injector, and wherein during the second condition, the pulse-width signal of the single direct injection fuel pulse is in a lift region of the direct injector. In any or all of the preceding examples, additionally or optionally, during each of the first and the second condition, a total fuel mass delivered via direct injection on the combustion cycle is maintained. In any or all of the preceding examples, additionally or optionally, the method further comprises, during a third condition, responsive to the pulse-width signal of the one of the multiple direct injection fuel pulses of the combustion cycle lying within the transition region of the direct injector, adjusting the pulse-width signal of each of the multiple direct injection fuel pulses to shift out of the transition region while maintaining a number of pulses of the multiple direct injection fuel pulses. In any or all of the preceding examples, additionally or optionally, the second condition includes a higher than threshold engine speed and the third condition includes a lower than threshold engine speed or a higher than threshold engine NVH level. In any or all of the preceding examples, additionally or optionally, the shifting and adjusting during each of the first, second, and third condition includes adjusting a total fuel mass delivered via direct injection on the combustion cycle, the method further comprising, adjusting a fuel mass delivered via port injection on the combustion cycle based on the adjusted total fuel mass delivered via direct injection.

Another example system comprises: an engine cylinder; a direct injector for fueling the cylinder; and a controller with computer readable instructions stored on non-transitory memory for: estimating an initial fuel injection profile for a combustion cycle of the cylinder based on engine speed-load and engine temperature, the initial fuel injection profile including multiple direct injection fuel pulses, at least one of the multiple direct injection fuel pulses having a pulse-width in a transition region of the direct injector; during a first condition, modifying the initial fuel injection profile to a first modified fuel injection profile having a smaller number of multiple direct injection fuel pulses, each of the smaller number of multiple direct injection fuel pulses having a smaller pulse-width in a lift region of the direct injector; and during a second condition, modifying the initial fuel injection profile to a second modified fuel injection profile wherein the pulse-width of a first set of the multiple direct injection fuel pulses is reduced into a ballistic region of the direct injector while the pulse-width of a second set of the multiple direct injection fuel pulses in raised into the lift region of the direct injector, while maintaining a number of multiple direct injection fuel pulses, wherein a total direct injected fuel mass in each of the first and second modified fuel injection profile is same as the fuel mass in the initial fuel injection profile. In the preceding example, additionally or optionally, the first condition includes a higher than threshold engine speed and the second condition includes a lower than threshold engine speed. In any or all of the preceding examples, additionally or optionally, the multiple direct injection fuel pulses of the initial fuel injection profile includes an initial number of direct injection fuel pulses, and wherein the modifying during each of the first and second condition is based on the initial number of direct injection fuel pulses, and further based on the pulse-width of the at least one of the multiple direct injection pulses relative to an upper pulse-width limit of the ballistic region and a lower pulse-width limit of the lift region. In any or all of the preceding examples, additionally or optionally, the method further comprises a port injector for fueling the cylinder, wherein the controller includes further instructions for: during a third second condition, modifying the initial fuel injection profile to a third modified fuel injection profile including adjusting the total direct injected fuel mass to move the pulse-width of the at least one of the multiple direct injection fuel pulses out of the transition region of the direct injector, and adjusting a port injected fuel mass based on the adjusted direct injected fuel mass.

Another example for an engine comprises: estimating an initial ratio of port injected fuel relative to direct injected fuel on a combustion cycle based on engine operating conditions; and responsive to a direct fuel injection at the initial ratio being in a transition region of a direct injector map, updating the initial ratio to move the direct fuel injection out of the transition region. In the preceding example, additionally or optionally, the transition region is positioned between a ballistic region and a lift region of the direct injector map, and wherein direct injector variability in the transition region is higher than each of the ballistic region and the lift region. In any or all of the preceding examples, additionally or optionally, the updating is based on a pulse-width of the direct fuel injection relative to each of a ballistic-to-transition border and a lift-to-transition border of the direct injector map. In any or all of the preceding examples, additionally or optionally, the updating includes, responsive to a distance of the direct fuel injection pulse-width from the ballistic-to-transition border of the direct injector map being smaller than the distance of the direct fuel injection pulse-width from the lift-to-transition border of the direct injector map, decreasing a direct injected fuel mass to move from the pulse-width from the transition region into the ballistic region of the direct injector map, while increasing a port injected fuel mass. In any or all of the preceding examples, additionally or optionally, the updating further includes, responsive to a distance of the direct fuel injection pulse-width from the ballistic-to-transition border of the direct injector map being larger than the distance of the direct fuel injection pulse-width from the lift-to-transition border of the direct injector map, increasing the direct injected fuel mass to move from the pulse-width from the transition region into the lift region of the direct injector map, while decreasing the port injected fuel mass. In any or all of the preceding examples, additionally or optionally, the initial ratio of port injected fuel relative to direct injected fuel includes multiple direct injections on the combustion cycle, and wherein the increasing and decreasing is based on a number of the multiple direct injections. In any or all of the preceding examples, additionally or optionally, the updating further includes adjusting the number of the multiple direct injections by decreasing the number of the multiple direct injections to move the pulse-width from the transition region into the lift region. In any or all of the preceding examples, additionally or optionally, the decreasing is responsive to the unadjusted number of the multiple direct injections being higher than a threshold. In any or all of the preceding examples, additionally or optionally, the updating further includes adjusting the number of the multiple direct injections by increasing the number of the multiple direct injections to move the pulse-width from the transition region into the ballistic region. In any or all of the preceding examples, additionally or optionally, the increasing is responsive to the unadjusted number of the multiple direct injections being lower than a threshold. In any or all of the preceding examples, additionally or optionally, the multiple direct injections include multiple direct injections in an intake stroke and/or a compression stroke of the combustion cycle, and wherein the updating further includes updating a split ratio of direct injected fuel delivered in the intake stroke relative to the compression stroke. In any or all of the preceding examples, additionally or optionally, the method may be implemented in a hybrid vehicle system.

Another example method comprises: during a first condition, responsive to a pulse-width of one of multiple direct injection fuel pulses of a combustion cycle lying within a transition region of a direct injector map, reducing a number of the multiple direct injection fuel pulses while maintaining a split ratio of direct injected to port injected fuel; and during a second condition, responsive to the pulse-width of the one of the multiple direct injection fuel pulses of the combustion cycle lying within the transition region of the direct injector, adjusting the split ratio of direct injected to port injected fuel. In any or all of the preceding examples, additionally or optionally, adjusting the split ratio includes, when more power, air charge cooling, or advanced spark is needed, such as at higher engine loads, increasing the split ratio of direct injected fuel to port injected fuel over the combustion cycle, and when lower loads when PM load is above a threshold, decreasing the split ratio of direct injected fuel to port injected fuel over the combustion cycle. In any or all of the preceding examples, additionally or optionally, when more direct injected fuel mass is needed to move the one of the multiple direct injection fuel pulses out of the transition region, increasing the split ratio of direct injected fuel to port injected fuel over the combustion cycle, and when less direct injected fuel mass is needed to move the one of the multiple direct injection fuel pulses out of the transition region, decreasing the split ratio of direct injected fuel to port injected fuel over the combustion cycle. In any or all of the preceding examples, additionally or optionally, adjusting the split ratio includes maintaining the number of multiple direct injection fuel pulses in the combustion cycle. In any or all of the preceding examples, additionally or optionally, adjusting the split ratio includes adjusting the number of multiple direct injection fuel pulses in the combustion cycle, as well as a fuel mass delivered in each of the multiple direct injection fuel pulses. In any or all of the preceding examples, additionally or optionally, during the first condition, the pulse-width of each of the reduced number of multiple direct injection fuel pulses is in a lift region of the direct injector. In any or all of the preceding examples, additionally or optionally, the first condition includes higher engine load and the second condition includes a lower engine load.

Another example engine system comprises: an engine cylinder; a direct injector for fueling the cylinder; a port injector for fueling the cylinder; and a controller with computer readable instructions stored on non-transitory memory for: estimating an initial fuel injection profile for a combustion cycle of the cylinder based on engine speed-load and engine temperature, the initial fuel injection profile including an initial split ratio of direct injected fuel to port injected fuel delivered via multiple direct injection fuel pulses, at least one of the multiple direct injection fuel pulses having a pulse-width in a transition region of the direct injector; and modifying the initial fuel injection profile to change the split ratio of direct injected fuel to port injected fuel so that the at least one of the multiple direct injection fuel pulses is moved out of the transition region. In any or all of the preceding examples, additionally or optionally, the modifying includes increasing or decreasing a port injected fuel mass relative to a total direct injected fuel mass based on the pulse-width of the at least one of the multiple direct injection pulses relative to an upper pulse-width limit of a ballistic region and a lower pulse-width limit of a lift region of the direct injector. In any or all of the preceding examples, additionally or optionally, decreasing the total direct injected fuel mass includes decreasing a number of the multiple direct injection fuel pulses to move the pulse-width of each of the decreased number of direct injection fuel pulses into the lift region, and wherein increasing the total direct injected fuel mass includes increasing the number of the multiple direct injection fuel pulses to move the pulse-width of each of the increased number of direct injection fuel pulses into the ballistic region.

In a further representation, the engine is coupled in a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising a controller with computer readable instructions stored in non-transitory memory for:
   delivering fuel to a cylinder during a combustion cycle as multiple direct injections;
   responsive to a fuel mass of one of the multiple direct injections being in a second region of a direct injector map describing mass of fuel injected as a function of fuel injector pulse width, updating one or more of a ratio of fuel delivered in each of the multiple direct injections and a number of the multiple direct injections and moving the fuel mass of the one of the multiple direct injections out of the second region, where the second region is positioned between a first region and a third region of the direct injector map, the first region including where no fuel is injected for a fuel injector pulse width and where a first linear relationship exists between an amount of fuel injected and the fuel injector pulse width, the second region where a non-linear relationship exists between the amount of fuel injected and the fuel injector pulse width, the third region where a second linear relationship exists between the amount of fuel injected and the fuel injector pulse width, the first, second, and third regions being distinct from each other; and
   responsive to the fuel mass of each of the multiple direct injections not being in the second region of the direct injector map describing mass of fuel injected as the function of fuel injector pulse width, injecting fuel in the multiple direct injections according to the direct injector map describing mass of fuel injected as the function of fuel injector pulse width.

2. The method of claim 1, wherein direct injector variability in the second region is higher than each of the first region and the third region.

3. The method of claim 2, wherein the updating is based on a position of the fuel mass relative to each of a first border between the first region and the second region and a second border between the second region and the third region of the direct injector map.

4. The method of claim 3, wherein the updating includes, responsive to a distance of the fuel mass from the first border of the direct injector map being smaller than a distance of the fuel mass from the second border of the direct injector map, decreasing the fuel mass of the one of the multiple direct injections to move the fuel mass from the second region into the first region of the direct injector map while increasing the fuel mass of another one of the multiple direct injections.

5. The method of claim 4, wherein the updating further includes, responsive to the distance of the fuel mass from the first border of the direct injector map being larger than the distance of the fuel mass from the second border of the direct injector map, increasing the fuel mass of the one of the multiple direct injections to move the fuel mass from the second region into the third region of the direct injector map while decreasing the fuel mass of another one of the multiple direct injections.

6. The method of claim 5, wherein the increasing and decreasing is based on the number of the multiple direct injections.

7. The method of claim 1, wherein updating the number of the multiple direct injections includes:

during a first condition, decreasing the number of the multiple direct injections by merging the one of the multiple direct injections with at least another of the multiple direct injections to move the fuel mass from the second region into the third region; and during a second condition, increasing the number of the multiple direct injections by splitting the one of the multiple direct injections into a plurality of direct injections in the first region.

8. The method of claim 7, wherein, during the first condition, an unadjusted number of the multiple direct injections is higher than a threshold number, and wherein, during the second condition, the unadjusted number of the multiple direct injections is higher than the threshold number.

9. The method of claim 1, wherein the multiple direct injections include multiple direct injections in an intake stroke and a compression stroke of the combustion cycle, and wherein the updating further includes updating a split ratio of direct injected fuel delivered in the intake stroke relative to the compression stroke.

10. The method of claim 1, further comprising adjusting an amount of the fuel delivered to the cylinder during the combustion cycle via port injection based on the updating.

11. A method for an engine, comprising:
during a first condition, responsive to a first pulse-width signal of a single direct injection fuel pulse of a first combustion cycle lying within a second region of a direct injector map describing mass of fuel injected as a function of fuel injector pulse width, shifting to operating with multiple direct injection fuel pulses a pulse-width signal of each of the multiple direct injection fuel pulses lying outside the second region, where the second region is positioned between a first region and a third region of the direct injector map, the first region including where no fuel is injected for a fuel injector pulse width and where a first linear relationship exists between an amount of fuel injected and the fuel injector pulse width, the second region where a non-linear relationship exists between the amount of fuel injected and the fuel injector pulse width, the third region where a second linear relationship exists between the amount of fuel injected and the fuel injector pulse width, the first, second, and third regions being distinct from each other;

during a second condition, responsive to a second pulse-width signal of one of multiple direct injection fuel pulses of a second combustion cycle lying within the second region of the direct injector map, shifting to operating with a single direct injection fuel pulse, a pulse-width signal of the single direct injection fuel pulse lying outside the second region; and responsive to the pulse-width signal of each of the direct injection fuel pulses not being in the second region of the direct injector map describing mass of fuel injected as the function of fuel injector pulse width, injecting fuel in the direct injection fuel pulses according to the direct injector map describing mass of fuel injected as the function of fuel injector pulse width.

12. The method of claim 11, wherein, during the first condition, the pulse-width signal of each of the multiple direct injection fuel pulses is in the first region of the direct injector map, and wherein, during the second condition, the pulse-width signal of the single direct injection fuel pulse is in the third region of the direct injector map.

13. The method of claim 11, wherein, during each of the first and second conditions, a total fuel mass delivered via direct injection during each of the first and second combustion cycles is maintained.

14. The method of claim 11, further comprising, during a third condition, responsive to a pulse-width signal of one of multiple direct injection fuel pulses of a third combustion cycle lying within the second region of the direct injector map, adjusting the pulse-width signal of each of the multiple direct injection fuel pulses to shift out of the second region while maintaining a number of pulses of the multiple direct injection fuel pulses.

15. The method of claim 14, wherein the second condition includes a higher than threshold engine speed and the third condition includes a lower than threshold engine speed or a higher than threshold engine NVH level.

16. The method of claim 15, wherein the shifting and adjusting during each of the first, second, and third conditions includes adjusting a total fuel mass delivered via direct injection during the first, second, and third combustion cycles, the method further comprising adjusting a fuel mass delivered via port injection during the first, second, and third combustion cycles based on the adjusted total fuel mass delivered via direct injection.

17. An engine system, comprising:
an engine cylinder;
a direct injector for fueling the cylinder; and
a controller with computer readable instructions stored on non-transitory memory to:
estimate an initial fuel injection profile for a combustion cycle of the cylinder based on engine speed-load and engine temperature, the initial fuel injection profile including multiple direct injection fuel pulses, at least one of the multiple direct injection fuel pulses having a pulse width in a second region of a direct injector map describing mass of fuel injected as a function of fuel injector pulse width, where the second region is positioned between a first region and a third region of the direct injector map, the first region including where no fuel is injected for a fuel injector pulse width and where a first linear relationship exists between an amount of fuel injected and the fuel injector pulse width, the second region where a non-linear relationship exists between the amount of fuel injected and the fuel injector pulse width, the third region where a second linear relationship exists between the amount of fuel injected and the fuel injector pulse width, the first, second, and third regions being distinct from each other;
during a first condition, modify the initial fuel injection profile to a first modified fuel injection profile having a smaller number of multiple direct injection fuel pulses, each of the smaller number of multiple direct injection fuel pulses having a pulse width in the third region of the direct injector; and
during a second condition, modify the initial fuel injection profile to a second modified fuel injection profile wherein a pulse width of a first set of the multiple direct injection fuel pulses is reduced into the first region of the direct injector map while a pulse width of a second set of the multiple direct injection fuel pulses is raised into the third region of the direct injector map, while maintaining a number of multiple direct injection fuel pulses;

wherein a total direct injected fuel mass in each of the first and second modified fuel injection profiles is the same as a fuel mass in the initial fuel injection profile; and responsive to the initial fuel injection profile not including at least one of the multiple direct injection fuel pulses having the pulse width in the second region of the direct injector map describing mass of fuel injected as the function of fuel injector pulse width, inject fuel in the multiple direct injections according to the direct injector map describing mass of fuel injected as the function of fuel injector pulse width.

18. The system of claim 17, wherein the first condition includes a higher than threshold engine speed and the second condition includes a lower than threshold engine speed.

19. The system of claim 17, wherein the multiple direct injection fuel pulses of the initial fuel injection profile include an initial number of direct injection fuel pulses, and wherein the modifying during each of the first and second conditions is based on the initial number of direct injection fuel pulses, and further based on the pulse width of the at least one of the multiple direct injection pulses relative to an upper pulse-width limit of the first region and a lower pulse-width limit of the third region.

20. The system of claim 17, further comprising a port injector for fueling the cylinder, wherein the controller includes further instructions to:

during a third condition, modify the initial fuel injection profile to a third modified fuel injection profile including adjusting the total direct injected fuel mass to move the pulse width of the at least one of the multiple direct injection fuel pulses out of the second region of the direct injector, and adjusting a port injected fuel mass based on the adjusted total direct injected fuel mass.

* * * * *